US008270924B2

(12) United States Patent
Lindenmeier et al.

(10) Patent No.: US 8,270,924 B2
(45) Date of Patent: Sep. 18, 2012

(54) ANTENNA DIVERSITY SYSTEM HAVING TWO ANTENNAS FOR RADIO RECEPTION IN VEHICLES

(75) Inventors: Heinz Lindenmeier, Planegg (DE); Stefan Lindenmeier, Gauting-Buchendorf (DE); Jochen Hopf, Haar (DE); Leopold Reiter, Gilching (DE)

(73) Assignee: Delphi Delco Electronics Europe GmbH, Troy, MI (US)

( * ) Notice: Subject to any disclaimer, the term of this patent is extended or adjusted under 35 U.S.C. 154(b) by 947 days.

(21) Appl. No.: 12/183,192

(22) Filed: Jul. 31, 2008

(65) Prior Publication Data

US 2009/0036074 A1 Feb. 5, 2009

(30) Foreign Application Priority Data

Aug. 1, 2007 (DE) .......................... 10 2007 036 040
Aug. 23, 2007 (DE) .......................... 10 2007 039 914

(51) Int. Cl.
*H04B 7/00* (2006.01)
*H04B 1/04* (2006.01)
(52) U.S. Cl. ..................................... 455/277.1; 455/129
(58) Field of Classification Search ............... 455/277.1, 455/278.1, 296, 562.1, 575.7, 121, 129, 101
See application file for complete search history.

(56) References Cited

U.S. PATENT DOCUMENTS

| | | | |
|---|---|---|---|
| 3,942,119 A | 3/1976 | Meinke et al. | |
| 4,070,677 A | 1/1978 | Meinke et al. | |
| 4,095,228 A | 6/1978 | Meinke et al. | |
| 4,602,260 A | 7/1986 | Lindenmeier et al. | |
| 4,752,968 A | 6/1988 | Lindenmeier et al. | |
| 4,791,426 A | 12/1988 | Lindenmeier et al. | |
| 4,914,446 A | 4/1990 | Lindenmeier et al. | |
| 5,029,308 A | 7/1991 | Lindenmeier et al. | |
| 5,049,892 A | 9/1991 | Lindenmeier et al. | |
| 5,097,270 A | 3/1992 | Lindenmeier et al. | |
| 5,138,330 A | 8/1992 | Lindenmeier et al. | |
| 5,204,979 A * | 4/1993 | Schenkyr et al. .......... 455/276.1 |
| 5,266,960 A | 11/1993 | Lindenmeier et al. | |

(Continued)

FOREIGN PATENT DOCUMENTS

DE 10 2005 043 304 3/2007

OTHER PUBLICATIONS

U.S. Appl. No. 12/689,969, filed Jan. 19, 2010.

(Continued)

*Primary Examiner* — Sonny Trinh
(74) *Attorney, Agent, or Firm* — J. Gordon Lewis

(57) ABSTRACT

There is an antenna diversity system for radio reception in moving vehicles which includes a receiver, and at least two antennas coupled to the receiver. These antennas transmit antenna feed signals to an antenna diversity module coupled between the receiver and the antennas. In at least one embodiment, the antenna diversity module comprises at least one evaluation circuit for evaluating an interference in a reception signal, and at least one processor for adjusting a magnitude and a phase angle of a linear combination of the antenna feed signals. The evaluation circuit reads and sends an interference indication signal to the processor to create a relatively low interference signal. Thus, the diversity module combines the antenna feed signals in an adjustable manner based on an magnitude of phase angle, to form a linear combined signal that is present at the output of the antenna diversity module as a reception signal.

19 Claims, 17 Drawing Sheets

U.S. PATENT DOCUMENTS

| | | | |
|---|---|---|---|
| 5,289,197 | A | 2/1994 | Lindenmeier et al. |
| 5,313,660 | A * | 5/1994 | Lindenmeier et al. ........ 455/135 |
| 5,589,839 | A | 12/1996 | Lindenmeier et al. |
| 5,619,214 | A | 4/1997 | Lindenmeier et al. |
| 5,801,663 | A | 9/1998 | Lindenmeier et al. |
| 5,818,394 | A | 10/1998 | Aminzadeh et al. |
| 5,826,179 | A | 10/1998 | Lindenmeier et al. |
| 5,850,198 | A | 12/1998 | Lindenmeier et al. |
| 5,905,469 | A | 5/1999 | Lindenmeier et al. |
| 5,926,141 | A | 7/1999 | Lindenmeier et al. |
| 5,929,812 | A | 7/1999 | Aminzadeh |
| 5,949,498 | A | 9/1999 | Rudolph |
| 5,973,648 | A | 10/1999 | Lindenmeier et al. |
| 6,011,962 | A | 1/2000 | Lindenmeier et al. |
| 6,123,550 | A | 9/2000 | Burkert et al. |
| 6,130,645 | A | 10/2000 | Lindenmeier et al. |
| 6,140,969 | A | 10/2000 | Lindenmeier et al. |
| 6,169,888 | B1 | 1/2001 | Lindenmeier et al. |
| 6,184,837 | B1 | 2/2001 | Lindenmeier et al. |
| 6,188,447 | B1 | 2/2001 | Rudolph et al. |
| 6,218,997 | B1 | 4/2001 | Lindenmeier et al. |
| 6,236,372 | B1 | 5/2001 | Lindenmeier et al. |
| 6,313,799 | B1 | 11/2001 | Thimm et al. |
| 6,317,096 | B1 | 11/2001 | Daginnus et al. |
| 6,377,221 | B1 | 4/2002 | Lindenmeier et al. |
| 6,400,334 | B1 | 6/2002 | Lindenmeier et al. |
| 6,421,532 | B1 | 7/2002 | Lindenmeier et al. |
| 6,430,404 | B1 | 8/2002 | Lindenmeier et al. |
| 6,574,460 | B1 | 6/2003 | Lindenmeier et al. |
| 6,603,434 | B2 | 8/2003 | Lindenmeier et al. |
| 6,603,435 | B2 | 8/2003 | Lindenmeier et al. |
| 6,611,677 | B1 | 8/2003 | Lindenmeier et al. |
| 6,633,258 | B2 | 10/2003 | Lindenmeier et al. |
| 6,653,982 | B2 | 11/2003 | Lindenmeier et al. |
| 6,664,921 | B2 * | 12/2003 | Pratt ........................ 342/357.63 |
| 6,768,457 | B2 | 7/2004 | Lindenmeier |
| 6,888,508 | B2 | 5/2005 | Lindenmeier |
| 6,911,946 | B2 | 6/2005 | Lindenmeier |
| 6,917,340 | B2 | 7/2005 | Lindenmeier |
| 6,925,293 | B2 | 8/2005 | Lindenmeier et al. |
| 6,927,735 | B2 | 8/2005 | Lindenmeier et al. |
| 6,956,533 | B2 | 10/2005 | Lindenmeier |
| 7,127,218 | B2 | 10/2006 | Lindenmeier |
| 7,403,167 | B2 | 7/2008 | Probst et al. |
| 7,555,277 | B2 | 6/2009 | Lindenmeier et al. |
| 7,564,416 | B2 | 7/2009 | Lindenmeier et al. |
| 7,702,051 | B2 | 4/2010 | Lindenmeier et al. |
| 7,724,850 | B2 * | 5/2010 | Kroeger et al. ............... 375/347 |
| 2001/0016478 | A1 | 8/2001 | Lindenmeier et al. |
| 2002/0118138 | A1 | 8/2002 | Lindenmeier et al. |
| 2002/0126055 | A1 | 9/2002 | Lindenmeier et al. |
| 2002/0154059 | A1 | 10/2002 | Lindenmeier et al. |
| 2002/0171600 | A1 | 11/2002 | Lindenmeier et al. |
| 2002/0196183 | A1 | 12/2002 | Lindenmeier |
| 2003/0164802 | A1 | 9/2003 | Lindenmeier |
| 2004/0113854 | A1 | 6/2004 | Lindenmeier |
| 2004/0160373 | A1 | 8/2004 | Lindenmeier |
| 2004/0164912 | A1 | 8/2004 | Lindenmeier et al. |
| 2004/0183737 | A1 | 9/2004 | Lindenmeier |
| 2004/0198274 | A1 | 10/2004 | Lindenmeier |
| 2006/0082494 | A1 | 4/2006 | Deininger et al. |
| 2006/0114146 | A1 | 6/2006 | Lindenmeier et al. |
| 2006/0182201 | A1 | 8/2006 | Lindenmeier et al. |
| 2007/0058761 | A1 | 3/2007 | Lindenmeier |
| 2007/0140389 | A1 | 6/2007 | Lindenmeier et al. |
| 2008/0218422 | A1 | 9/2008 | Lindenmeier et al. |
| 2008/0248770 | A1 | 10/2008 | Schutz et al. |
| 2008/0260079 | A1 | 10/2008 | Lindenmeier et al. |
| 2009/0042529 | A1 | 2/2009 | Lindenmeier et al. |
| 2009/0073072 | A1 | 3/2009 | Lindenmeier et al. |
| 2010/0066618 | A1 | 3/2010 | Heuer |

OTHER PUBLICATIONS

U.S. Appl. No. 12/716,318, filed Mar. 3, 2010.
U.S. Appl. No. 12/786,236, filed May 24, 2010.

* cited by examiner

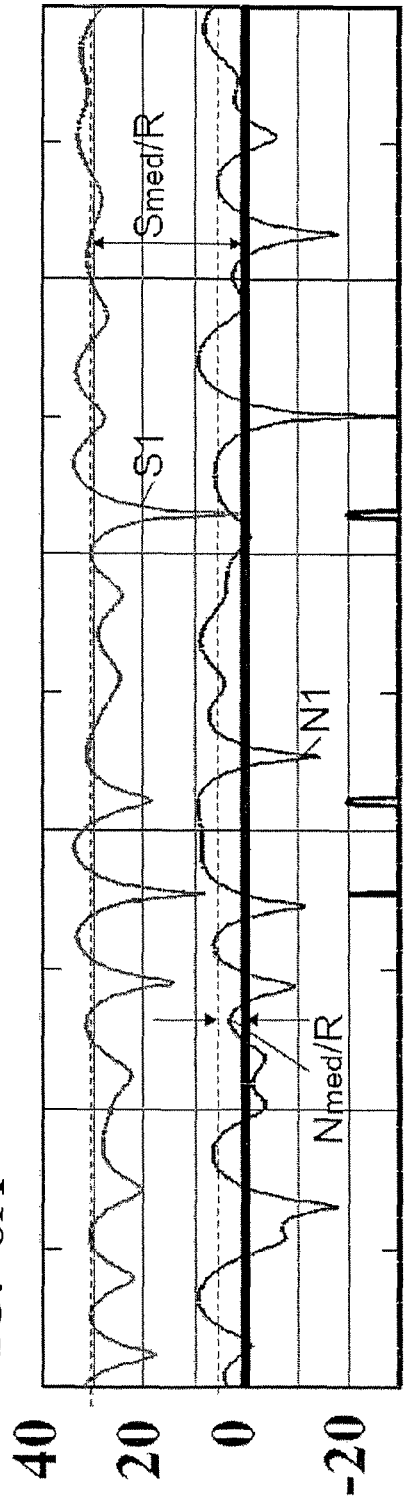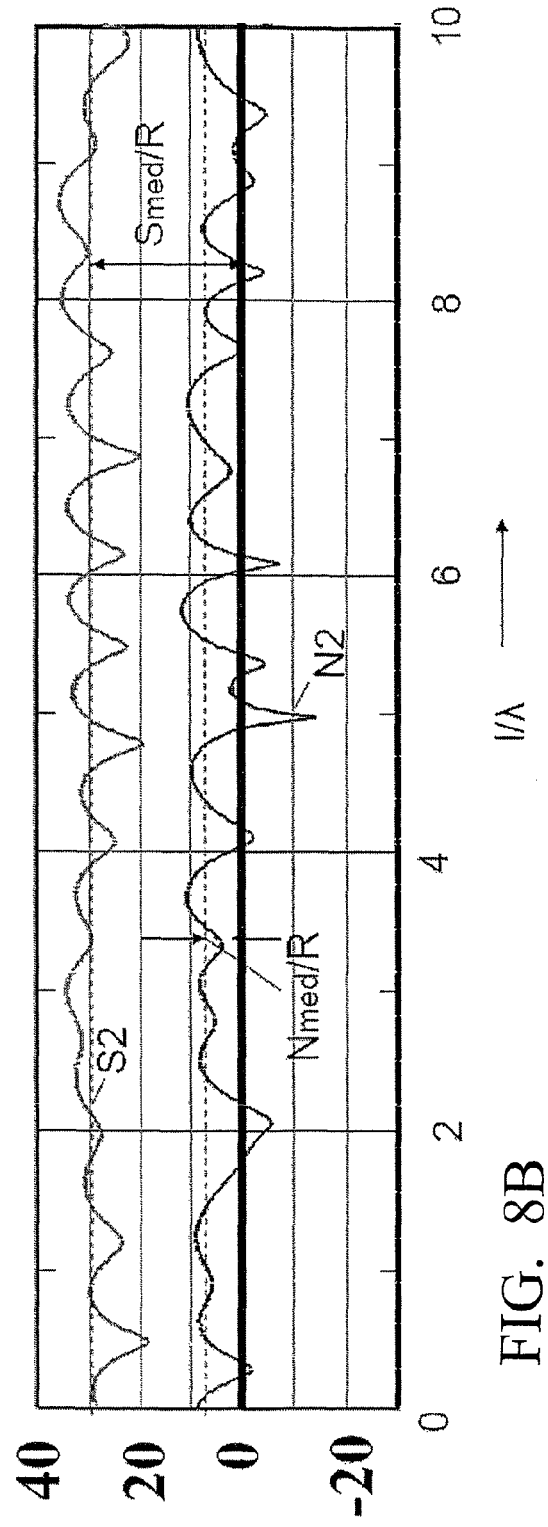
FIG. 8A
FIG. 8B

Curve 1: Weighting according to optimal phase and amount
Curve 2: Weighting according to exclusively optimal phase
Curve 3: Switching diversity with Antenna 1 and Antenna 2

Curve 1: Weighting according to optimal phase and amount
Curve 2: Weighting according to exclusively optimal phase
Curve 3: Switching diversity with Antenna 1 and Antenna 2

Curve 1: Weighting according to optimal phase and amount
Curve 2: Weighting according to exclusively optimal phase
Curve 3: Switching diversity with Antenna 1 and Antenna 2

Curve 1: Weighting according to optimal phase and amount
Curve 2: Weighting according to exclusively optimal phase
Curve 3: Switching diversity with Antenna 1 and Antenna 2

ANTENNA DIVERSITY SYSTEM HAVING TWO ANTENNAS FOR RADIO RECEPTION IN VEHICLES

CROSS REFERENCE TO RELATED APPLICATIONS

This application claims priority from German Application Serial No. DE102007036040.3 filed on Aug. 1, 2007 and German Application Serial No. DE102007039914.8 filed on Aug. 23, 2007 the disclosures of which are hereby incorporated herein by reference.

BACKGROUND

The invention relates to an antenna diversity system for radio reception in vehicles, which comprises a receiver, two antennas, with antenna feed lines connected to an antenna diversity module. The diversity module is connected with the receiver by way of a receiver line, on the output side, and an evaluation circuit, which evaluates the interference in a reception signal just arriving at the receiver.

An antenna diversity system of this type is preferably used for ultra-short-wave radio reception, and is known from DE 102 005 403 304. Particularly in the case of an ultra-short-wave radio reception system, which is part of the standard equipment of vehicles, for the most part, the efficiency of the system is of particular importance. The advantages achieved with antenna diversity systems of this type are mainly in the creation of a particularly economical solution with regard to a good desired signal/interference signal ratio, also with regard to same-channel or adjacent-channel interference. These advantages allow the system to be configured for a plurality of antennas, while simultaneously minimizing the amount of cables in the vehicle. If the antenna diversity module is in the vicinity of a compact multi-antenna system, for example, such as on the rear window of a vehicle, only one receiver line to the receiver is required even when there are a plurality of antennas.

However, with an antenna diversity system according to the previously known patent application, it is too complicated or it is impossible to use the plurality of the antennas provided, in most cases four, in order to achieve sufficient diversity efficiency. In these cases, it is desirable to improve the diversity efficiency that can be achieved with the small number of antennas such as only two antennas, particularly with regard to reducing adjacent-channel interference. This form of interference has become dominant, particularly in the ultra-short-wave radio frequency range, because of the great increase in the number of new radio stations, and the resulting frequency channels of the radio stations, which partially overlap in border regions.

SUMMARY

One goal of at least one embodiment of the invention is to avoid these disadvantages and to configure an antenna diversity system that is both cost-advantageous and highly efficient, which makes it possible to make reception interference, particularly interference caused by adjacent radio channels, as slight as possible.

One embodiment of the invention relates to an antenna diversity system for radio reception in moving vehicles. One embodiment includes a receiver coupled to a receiver line, and at least two antennas coupled to the receiver. These antennas have associated antenna feed lines coupled thereto for transmitting a plurality of antenna feed signals. These antenna feed signals are transmitted to an antenna diversity module coupled to the receiver at one end via the receiver line, and at the opposite end to the antennas via the antenna feed lines. In at least one embodiment, the antenna diversity module comprises at least one evaluation circuit for evaluating an interference in a reception signal from the antenna feed signals. In at least one embodiment, the antenna diversity module can have at least one processor for adjusting a magnitude and a phase angle of a linear combination of the antenna feed signals for creating a relatively low interference reception signal such as a non-disturbing-low interference reception signal by the evaluation circuit reading and sending an interference indication signal to the processor. With this embodiment, the diversity module combines the antenna feed signals in an adjustable manner based on a magnitude and a phase angle, to form a linear combined signal that is present at the output of the antenna diversity module as a reception signal.

Another advantage of the invention is that an optimal desired signal/interference signal ratio can be adjusted by means of the weighting of the summation of the two antenna signals at every point in time. This weighting can be adjusted in combined manner, according to the magnitude and phase angle, by a processor, using a search algorithm. With this design, the momentary ratio of desired signal S in the desired frequency channel relative to the entire interference, consisting of the summation of inherent noise R and adjacent-channel interference N, can be optimized in low-effort manner, at a predetermined noise level R of the system.

A resulting directional diagram of the two antennas is obtained by means of adjusting the complex weighting of the antenna signals, at every point in time, so that the partial waves of the desired signal, as well as the partial waves of the adjacent-channel signal, which are superimposed from the different spatial directions, yield the aforementioned optimal desired signal/interference signal ratio, taking the inherent noise R into consideration.

With radio systems whose operation is not impaired by adjacent-channel interference, or no effective suppression of such interference is provided, the maximum ratio method is used. Such an antenna system is known from EP 11266, which is aimed at achieving a greater desired signal than with a single antenna, by means of same-phase summation of two or also more antenna signals, to thereby reduce the likelihood of level collapses in a territory with multi-path propagation. With this design, a maximal signal-to-noise ratio is obtained in the sum signal of the antennas.

However, the prior art includes at least one embodiment which includes received interference signals with frequency components in the desired frequency channel, wherein these signals occur in the desired channel due to lack of separation clarity in the receiver. Thus, the same phasing of antenna signals, according to this method, does not yield sufficient suppression of such interference. The resulting diversity efficiency is not sufficient, taking adjacent-channel interference into consideration.

Adjacent-channel interference generally occurs on the basis of a limited selection on the intermediate frequency plane. Signals that occur in the reception channel due to intermodulation of other ultra-short-wave stations also cause frequency-deviation interference on the desired signal, in connection with level collapses, and this cannot be eliminated with the phase regulation system in the case of same phasing.

However, the arrangement indicated in EP 1126631 possesses the remaining disadvantage that in case of the occurrence of same-channel or adjacent-channel interference caused by undesired radio stations—which frequently form a cause for interference, because of the close frequency occupation with stations—level maximization by means of same phasing of the desired signal generally does not eliminate the interference phenomenon.

Instead, in such situations it is important to improve the ratio of desired signal to interference signal. If the selection of a different reception signal, in terms of diversity, from the plurality of antennas, does not result in interference-free reception, same phasing of the desired signal cannot lead to the goal, because generally the interfering same-channel or adjacent-channel signal will not be suppressed with this.

One of the main advantages of the invention results in the creation of a particularly economical antenna diversity system having all the advantages with regard to a good signal-to-noise ratio, also with regard to same-channel or adjacent-channel interference, with only two antennas, and, at the same time, a minimal cable expenditure in the vehicle. If the antenna diversity module is situated in the vicinity of a compact system having only two antennas, for example, such as on the rear window of a vehicle, for example, only one receiver line to the receiver is required.

Improvement of the desired signal/interference signal ratio with regard to same-channel or adjacent-channel interference can be achieved, according to the invention, by means of the processor, wherein the processor creates an adjustment in the magnitude and phase angle of the two antenna reception signals is always given, for a linear combination of the two signals, for a low-interference reception signal such as a reduced-interference signal. The cost-advantageous availability of the electronic and electrical components required for this, in the antenna diversity module, which unit is preferably positioned close to an antenna system 2 having 2 antennas, makes it possible, in combination with only one connection line to the receiver, to implement a concept that is both cost-advantageous for automobile construction and particularly attractive with regard to handling.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 8A is a first graph of the relative momentary values of the signal levels S1, and the adjacent-channel levels N1, on the desired frequency channel showing two reception signals;

FIG. 8B is a first graph of the relative momentary values of the signal levels S2, and the adjacent-channel levels N2, on the desired frequency channel showing two reception signals;

DETAILED DESCRIPTION

Figure 1:
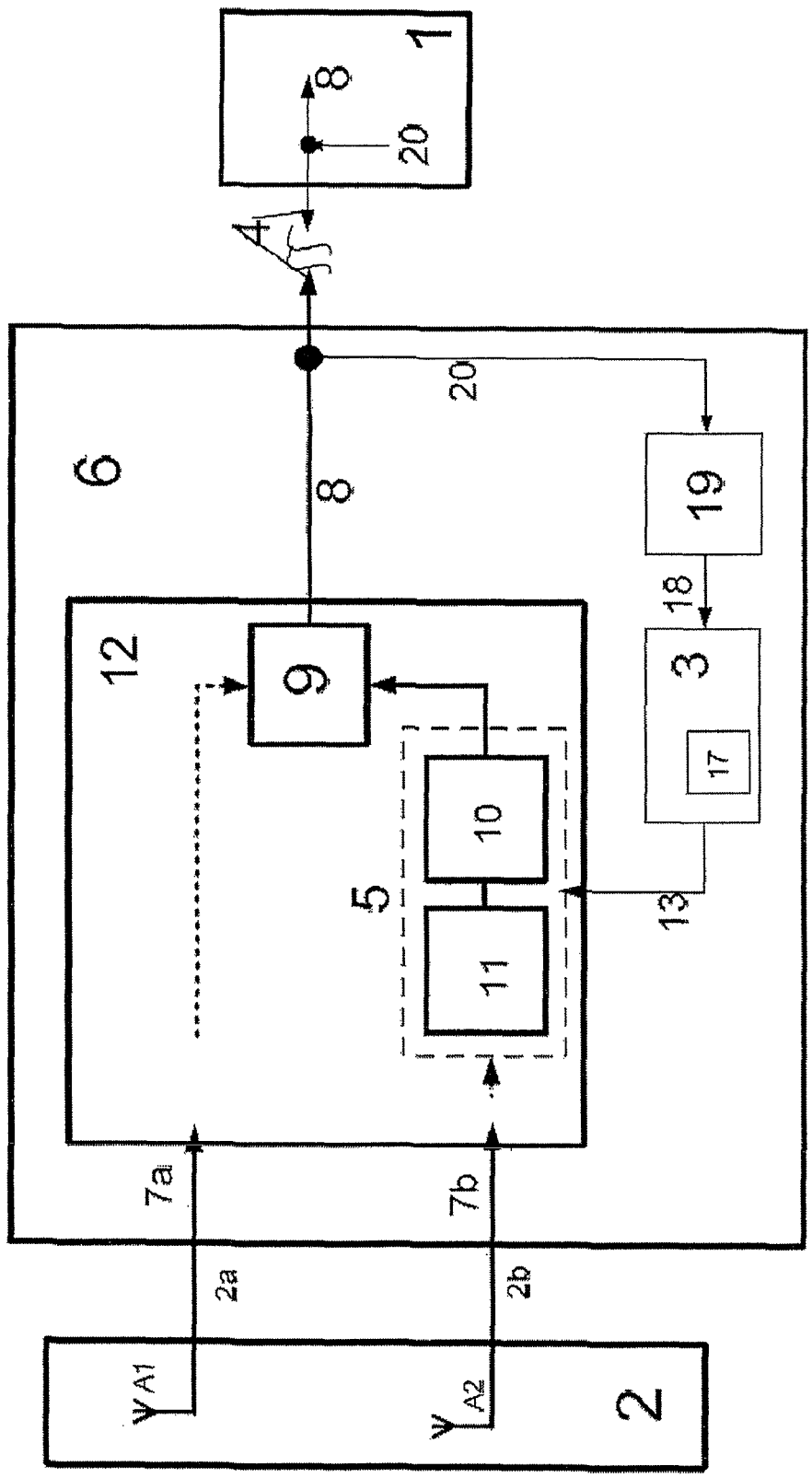
FIG. 1 is a schematic block diagram of an antenna diversity system, with two antennas, an antenna diversity module, and a receiver line to the receiver.

FIG. 1 is a schematic block diagram of an antenna diversity system, with two antennas A1 and A2 in an antenna group 2, antenna diversity module 6, and receiver line 4 coupled to receiver 1. An adjustable linear combination element 12 is present in the antenna diversity module 6, and which receives antenna reception signals 7a, 7b, after being changed in terms of magnitude and phase. These signals 7a and 7b are superimposed in at least one adjustable transmission element 5 contained in combination element 12, in the summation element 9, thereby forming the reception signal 8. The related intermediate-frequency signal 20, for example, is passed to the evaluation circuit 19 by way of the receiver line 4, for an evaluation of the interference of the reception signal 8. The processor 3 controls the adjustable transmission element 5 on the basis of the interference indication signal 18, received from evaluation circuit 19 always in such a manner that a low-interference reception signal 8 is achieved.

The interference indication signal 18 triggers a setting process in the processor 3, for adjustable transmission element 5. Successive different settings of adjustable transmission element 5 are performed using a search algorithm 17 stored in the memory of processor 3. Search algorithm 17 continues working until the signal-to-distortion ratio (SDR) indicated by means of the interference indication signal 18 is great enough for reception to be perceived as pure. This determination of a "pure" reception can be predetermined experimentally via audible detection of the quality of the signal.

Figure 2:
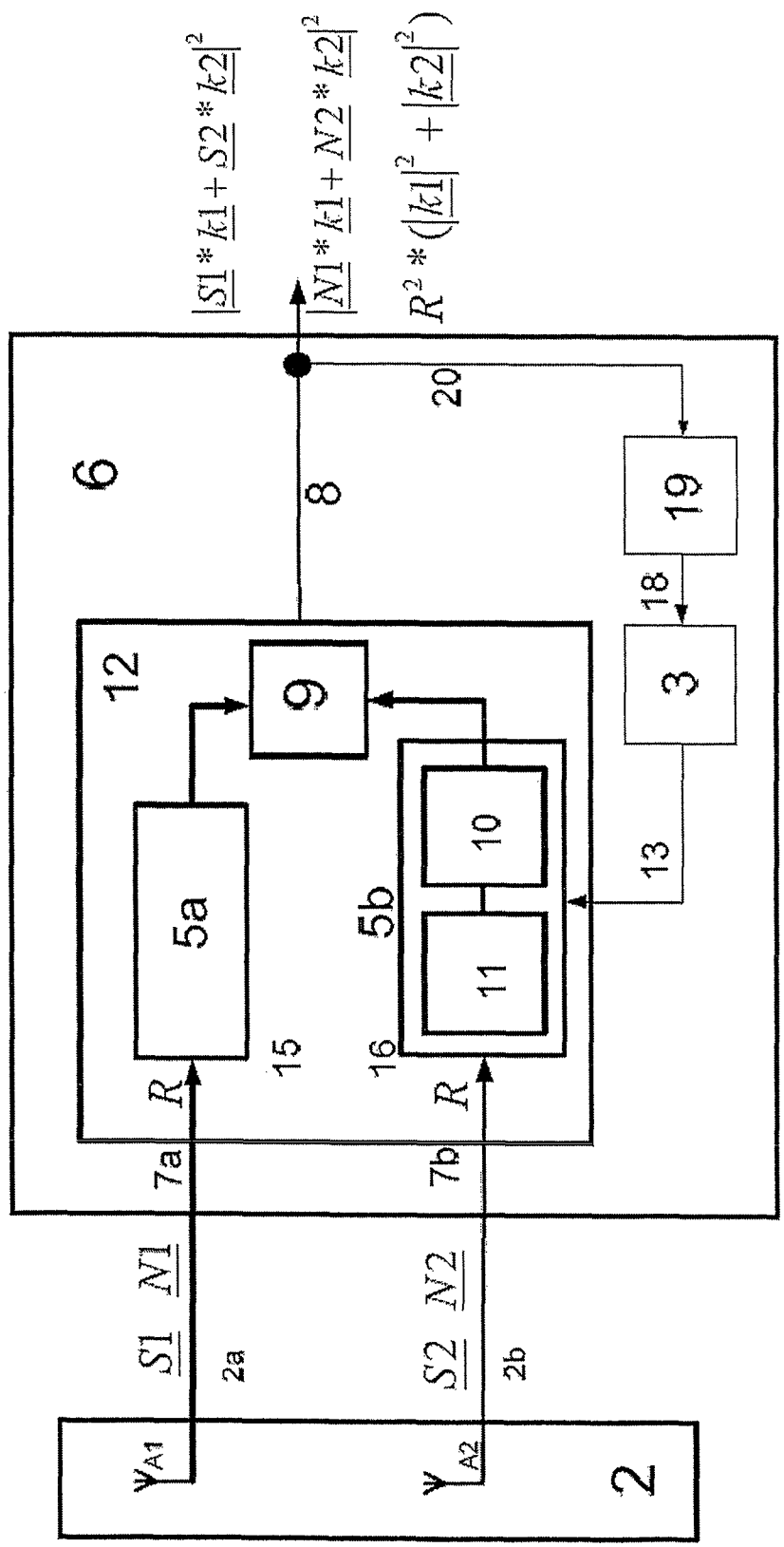
FIG. 2 is an antenna diversity system as in FIG. 1, but with two signal paths shown, in an adjustable linear combination element.

FIG. 2 is an antenna diversity system as in FIG. 1, but with two signal paths 15, 16 shown, in the adjustable linear combination element 12, with an adjustable transmission element 5a, 5b, in each instance. In this case, there are corresponding complex transmission factors k1, k2, for an explanation of the method of effect of the invention. S1, S2 represent the complex amplitudes of the desired components, and N1, N2 represent the interference-caused components in the antenna reception signal 7a, b of the reception channel. The variable R represents the noise in the two signal paths. The signals forming reception signal 8 at the output of the antenna diversity module 6 describe the power components of the linear, combined, desired signal (top), of an adjacent channel (center), and the noise power (bottom).

At the output of the antenna diversity module 6, the power components in the reception signal 8 are listed for an explanation of the method of effect of the invention. In this connection, S1 and S2, respectively, are the current desired reception signals of the antennas 1 and 2, respectively, in accordance with magnitude and phase. The typical progression of these signals over the path route traveled, in a reception field in which interference is due to multi-path propagation, is shown in FIG. 8, in relation to the inherent noise R of the system. The distance between the median value $S_{med}$ of the desired antenna signals in dB is indicated with $S_{med}/R$. The values k1 and k2, respectively, represent the current transmission factors set by the processor 3 at each reception location, in accordance with magnitude and phase, with which the reception signals S1, S2 of the antennas appear, weighted at the output of the antenna diversity module 6. The power form of the linear combined signal in the reception signal 8 is therefore:

$$|S1*k1+S2*k2|^2 \quad (1)$$

The signal components that represent the main interference of an adjacent channel in the frequency range of the desired channel, N1 and N2, respectively, are also subject to multi-path propagation—just like the signals S1, S2—and are merely to be expected at lower levels, as shown in FIG. 8. The distance of the median value $N_{med}$ of the adjacent-channel antenna signals in dB is indicated by $N_{med}/R$. Both complex signal components N1, N2 are combined in linear manner, in the same way, so that the power form of these signal components in the reception signal is as follows:

$$|N1*k1+N2*k2|^2 \quad (2)$$

The decorrelated noise given off by the antennas, at $$R^2*(|k1|^2+|k2|^2) \quad (3)$$

is added to the power of these interference signals, so that the current desired signal/interference signal ratio SDR is derived as follows:

$$SDR = \frac{|S1*k1+S2*k2|^2}{|N1*k1+N2*k2|^2+R^2*(|k1|^2+|k2|^2)} \quad (4)$$

The complex signals stated with reference to the corresponding median values $S_{med}$, $N_{med}$, which signals contain the magnitude and phase, are:

$$S1' = \frac{S1}{S_{med}}; S2' = \frac{S2}{S_{med}}; N1' = \frac{N1}{N_{med}}; N2' = \frac{N2}{N_{med}} \quad (5)$$

if one describes the ratio of the two transmission factors k1 and k2 with $$k=k2/k1 \quad (6)$$

then the desired signal/interference signal ratio SDR can be indicated in the following, easy-to-understand form:

$$SDR = \frac{S_{med}^2}{R^2} * \frac{|S1'+S2'*k|^2}{|N1'+N2'*k|^2*N_{med}^2/R^2+(1+|k|^2)} \quad (7)$$

In a Rayleigh reception field that is assumed for these deliberations, the factors $$\frac{S_{med}^2}{R^2}$$

and $N_{med}^2/R^2$ can be viewed as being constant, in each instance, in a certain range, while the signals S1, S2, N1, N2 can be viewed as statistically greatly varying variables. The essence of the present invention therefore comprises setting a complex transmission factor k=k2/k1 at every reception location of the traveled path route, so that a maximum is obtained for the desired signal/interference signal ratio SDR, i.e. a value is obtained when it allows sufficiently interference-free reception.

The complex transmission factor k is characterized by its magnitude |k|, and its phase. As disclosed in formula 6 above, |k| is a ratio of the two amplification factors |k1| and |k2|. The phase can be set as any desired initial value and then altered through a series of searching tests described below. Once the desired phase is determined, the magnitude |k| can then be altered to arrive at a reception signal with a relatively low level of interference signal, and which is audibly determined to be pure.

Because of the statistical nature of both the desired signal components and also of the interference signal components, the required setting of the linear combination of the antenna reception signal 7a, b, according to magnitude and phase, takes place using a search algorithm 17, which is stored in the memory of processor 3. Both the value of the phase of k in the range from 0° to 360° and the magnitude of k in the range from −20 dB to +20 dB vary quickly, depending on the driving speed, and require a correspondingly quickly operating processor 3 to adhere to the condition for great SDR at every location of the traveled path route. For full effectiveness, a readjustment of the complex transmission factor k is required approximately every λ/20 of the traveled path route.

The time period for λ/20 is determined by the velocity of the driven car. Essentially, this time period is sufficiently short so that interference of the reception signal (8) arriving at receiver (1) is successively reduced in steps that follow one another within a relatively short period of time.

To set an advantageous value for k, various search algorithms 17 can be used, according to the invention. If one were to use a search algorithm of a kind that searches the angle space of 360° in 10° steps, and the level space from −20 dB to plus 20 dB, for the magnitude of |k|, in steps of 1 dB, then in the most disadvantageous case, 36*40=1440 steps would be necessary in order to achieve a reliable optimum. Studies have shown, however, that it is possible, according to the invention, to determine a relative minimum of interference values in the search process, with the magnitude |k| of the linear combination set in fixed manner, in a few search steps, at first, by means of varying the phase of k, and then to continue the search process for the magnitude at this phase value that has been determined, at first in large steps, and then making a transition to smaller steps, by comparison.

The search process is stopped when the interference indication signal 18 assumes a small value that corresponds to reception perceived as being pure, i.e. when the interference indication signal 18 assumes a minimal value. In this connection, it proved to be sufficient if the phase angle is precisely optimized to approximately 10°, and the magnitude to approximately 1 dB. It proved to be particularly advantageous, in this connection, that because of the nature of the field distribution in the reception field in which interference occurs due to multi-path reception, it is practically completely sufficient to determine a relative minimum of the interference indication signal 18 for the phase, at first, and subsequently to search for the optimal value of the magnitude of k at this setting of the phase. To limit the search process to as few steps as possible, it is advantageous, to determine the interference in the angle space by comparison, with regard to larger step searches using angle quadrants across an entire 360 degree range, in order to continue, proceeding from the angle value having the least interference, by means of halving the remaining angle spaces, in each instance, successively up to an angle resolution of about 10°.

In the subsequent search for the optimal magnitude of k, proceeding from 10 dB steps, an optimal value for the complex k can finally be set in analogous manner, with ever smaller dB steps, with a few settings. In this way, it is possible, according to the invention, to assure a fitting setting for a linear combination at a driving speed of 100 km/h, every λ/20 of the traveled path route—i.e. within 5.3 milliseconds. Thus, the search process should be finalized within a time frame of within approximately 300 microseconds, in order to have it short enough so that the system is updated within 5.3 milliseconds. Accordingly, the above times are examples, regardless of the time period for updating the system, the time period for completing the search process should be only a relatively small fraction of the total time for updating the system such as approximately ¹/₁₀ of the total time for updating the system.

Figure 3:
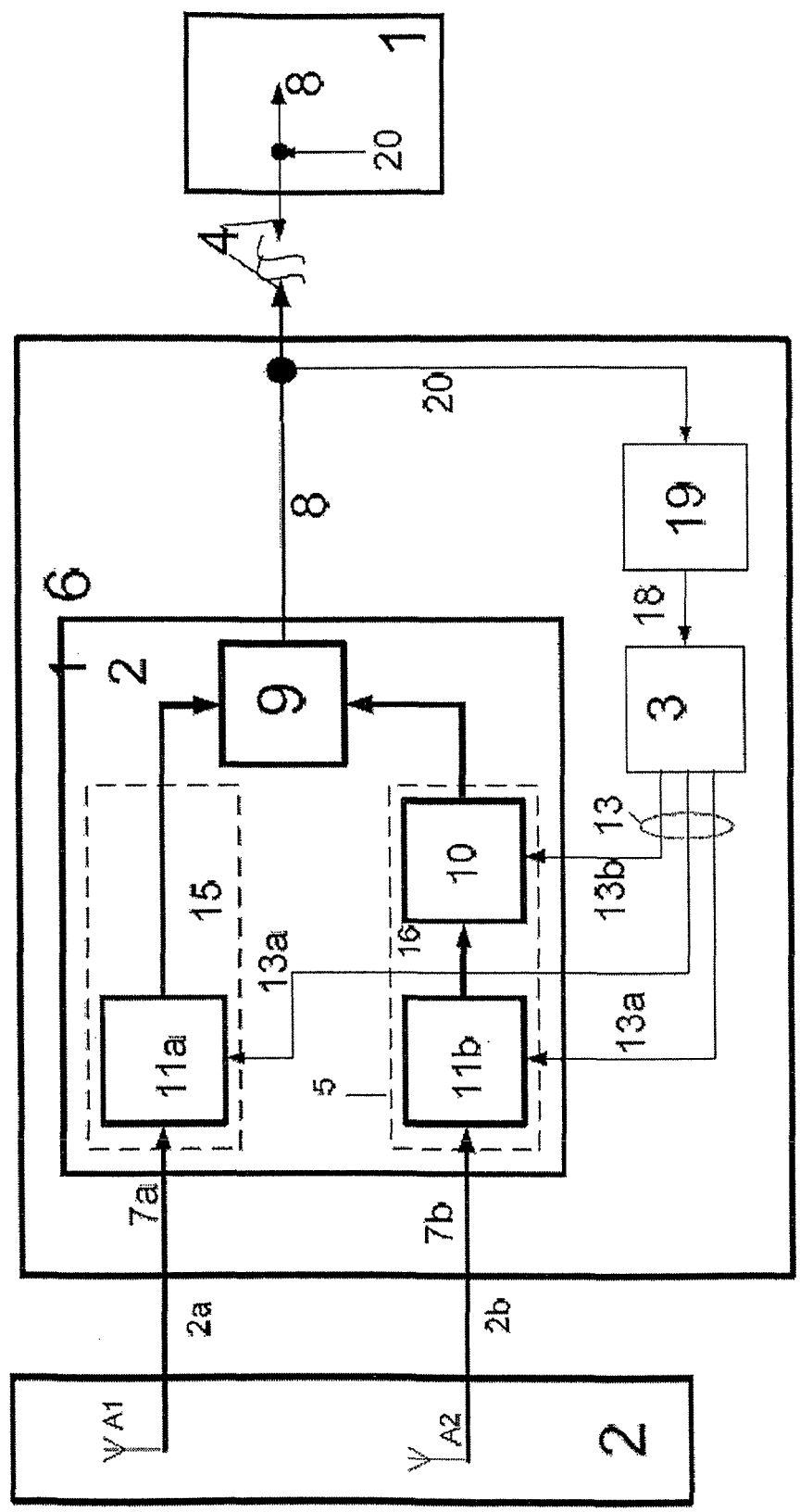
FIG. 3 is a schematic block diagram of a modified version of the antenna diversity system shown in FIG. 2.

FIG. 3 is an Antenna diversity system as in FIG. 2, with an adjustable signal level element 11a in the first separate signal path 15, and an adjustable signal level element 11b with a subsequent adjustable phase-rotation device 10 in the adjustable transmission element 5 in the second separate signal path 16.

For example, a first and a second separate signal path 15, 16 are configured to form the linear combination. The setting of the signal levels of the antenna reception signals 7a, and 7b before superimposition takes place with an adjustable signal level element 11a in the first signal path 15, and an adjustable signal level element 11b in the second signal path 16. In this manner, the magnitude of k can be changed within wide limits. The adjustable signal level elements 11a and 11b can advantageously be configured as simple adjustable damping elements—for example as pin-diode damping elements. Setting of the phase of k can advantageously take place with an adjustable phase-rotation device 10 in the adjustable transmission element 5 in the second separate signal path 16. For implementation of an adjustable phase-rotation device 10, circuits are known that allow setting of the phase, using the voltage applied to a capacitor diode, for example using a 90° hybrid. In this example, the evaluation circuit 19 and the processor 3 are accommodated in the antenna diversity module, and the reception signal 8 is passed to the evaluation circuit 19 by way of the receiver line 4, for checking for interference in the form of the IF signal 20 formed in the receiver 1.

Figure 4:
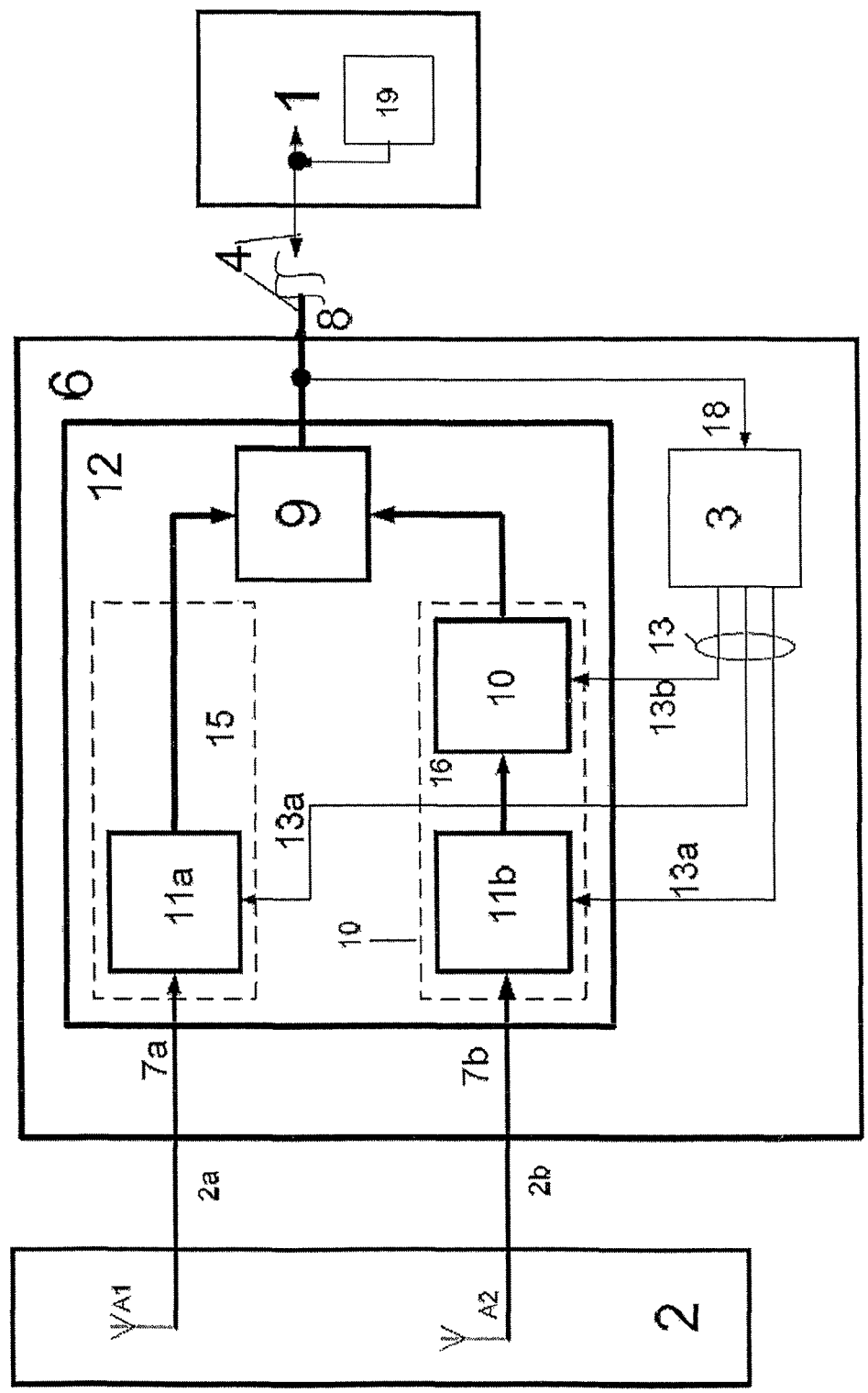
FIG. 4 is a schematic block diagram of an antenna diversity system as in FIG. 3, but with an evaluation circuit situated in the receiver.

FIG. 4 is an antenna diversity system as in FIG. 3, but with an evaluation circuit 19 situated in the receiver 1. With this embodiment, the interference indication signal 18 is passed to the antenna diversity module 6, by way of the receiver line 4, and from there to the processor 3. With this embodiment, the evaluation circuit 19 is for checking the reception signal 8 which is accommodated in the receiver 1, and the interference indication signal 18 is passed to the antenna diversity module 6 by way of the receiver line 4, and from there to the processor 3.

Figure 5:
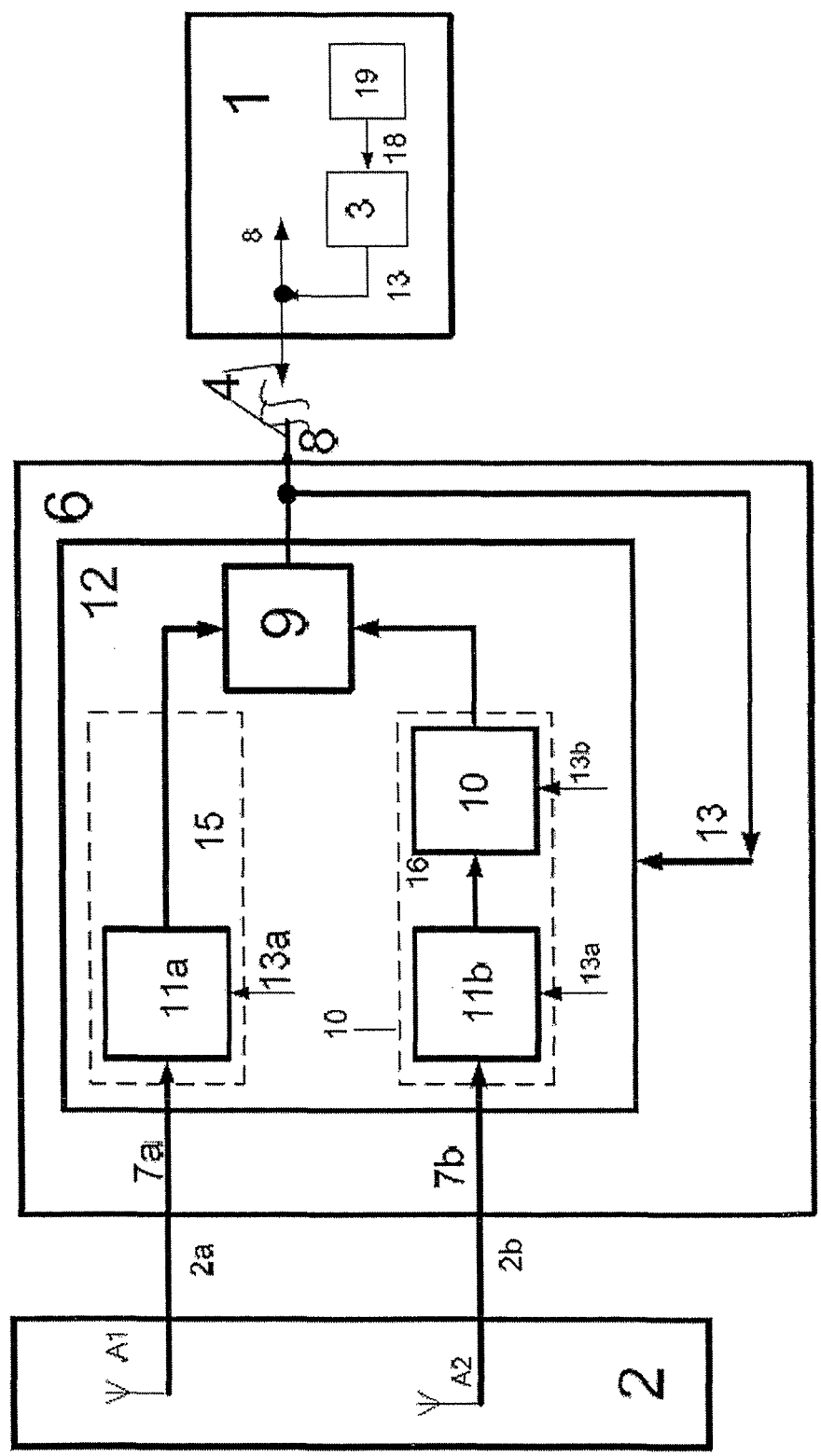
FIG. 5 is an antenna diversity system as in FIG. 4, but with a processor situated in the receiver.

FIG. 5 is the antenna diversity system as in FIG. 4, but with a processor 3 situated in receiver 1, whose setting signals 13, preferably configured digitally, consisting of level setting signals 13a and phase setting signals 13b. These signals are passed to the adjustable linear combination element 12, by way of receiver line 4. With this design, evaluation circuit 19 and processor 3 are accommodated in receiver 1. Setting signals 13 generated by processor 3, consisting of level setting signals 13a and phase setting signals 13b, are preferably configured digitally and are passed to the antenna diversity module 6 by way of the receiver line 4, and from there to the digitally adjustable linear combination element 12.

Figure 6:
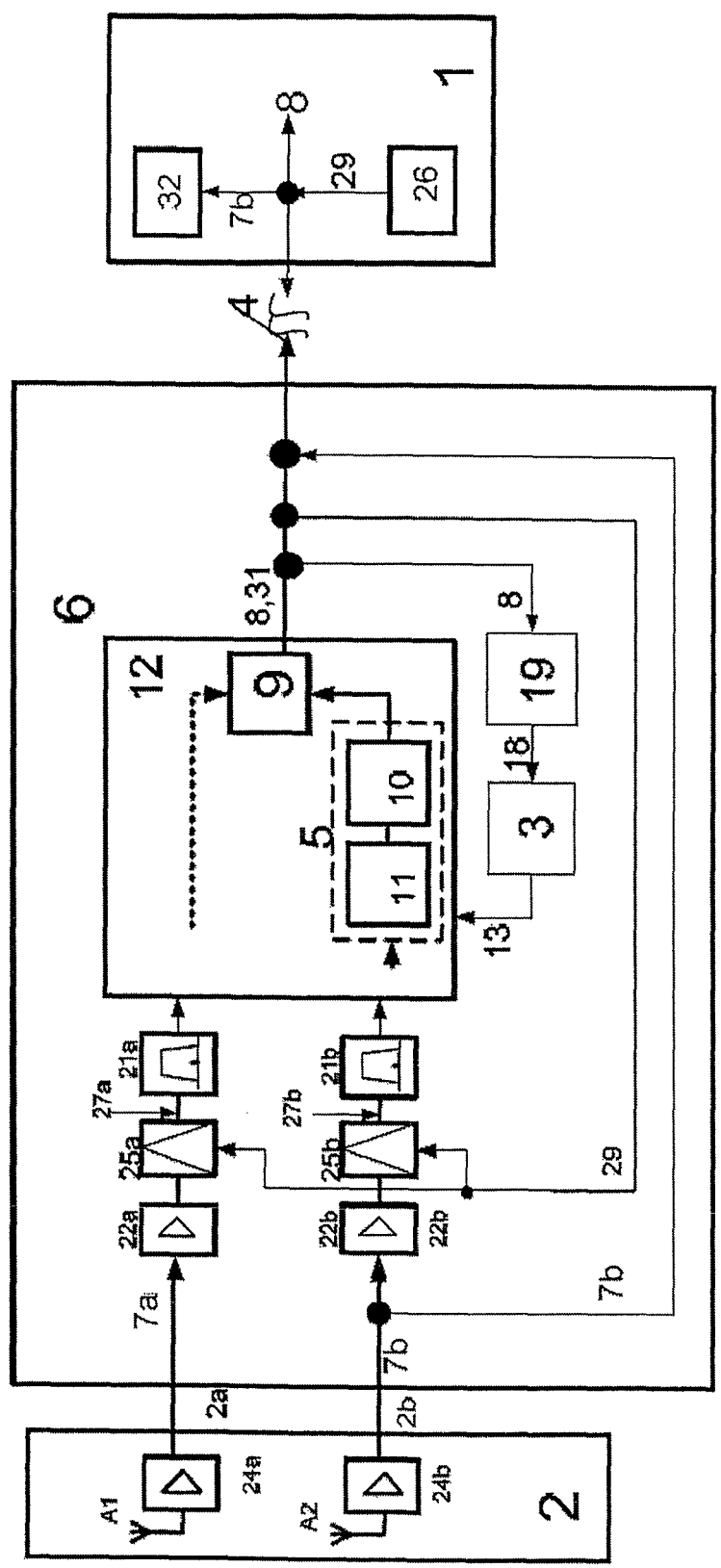
FIG. 6 is a schematic block diagram of an antenna diversity system as in FIG. 1, but with IF frequency converters and other additional components.

FIG. 6 is a schematic block diagram of the antenna diversity system as in FIG. 1, but with IF frequency converters 25a, 25b for conversion and filtering in the IF filters 21a, 21b of the antenna reception signals 7a, b amplified by way of antenna amplifiers 24a, 24b or by way of amplifiers with pre-selection 22a, 22b, respectively. The reception signals on the intermediate-frequency plane 27 are passed to an adjustable linear combination element 12 configured for the intermediate frequency, and combined in linear manner there. The reception signal 8 is passed to the receiver 1 for further processing, by way of the receiver line 4, as an IF reception signal 31. Tuning of the system to the desired reception channel takes place by way of the oscillator voltage 29 produced in the receiver 1 by the oscillator 26, which voltage is passed to the two IF frequency converters 25a, 25b in the antenna diversity module 6, by way of the receiver line 4.

For example, these the antenna reception signals 7a, b are converted to the intermediate-frequency plane 27a, 27b at the input of the antenna diversity module 6, with the IF frequency converters 25a, 25b present there, with subsequent filtering in the IF filters 21a, 21b. In advantageous manner, the antenna amplifiers 24a, 24b, or the amplifiers ahead of the frequency converters 25a, 25b, respectively, are equipped with a pre-selection 22a, 22b for suppression of mirror frequency signals. The reception signals on the intermediate-frequency plane 27 are passed to an adjustable linear combination element 12 configured for the intermediate frequency, and combined in linear manner there. The advantage connected with this arrangement is that both the adjustable phase-rotation device 10 and the adjustable signal level element 11a, 11b can be configured more simply on the intermediate frequency. The reception signal 8 is passed to the receiver 1 for further processing, by way of the receiver line 4, as an IF reception signal 31. Tuning of the system to the desired reception channel takes place by way of the oscillator voltage 29 produced in the receiver 1 by the oscillator 26, which voltage is passed to the two IF frequency converters 25a, 25b in the antenna diversity module 6, by way of the receiver line 4.

Figure 7:
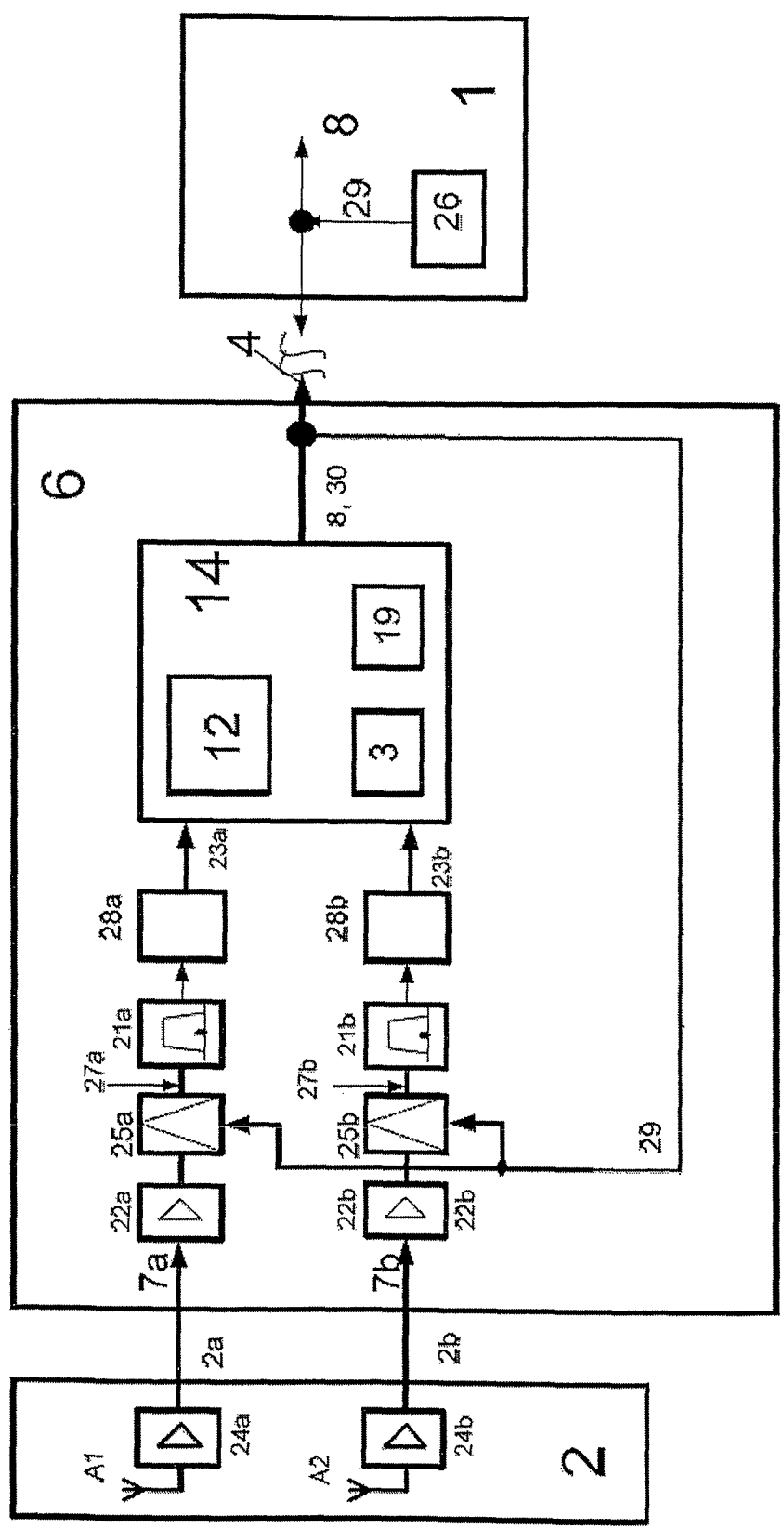
FIG. 7 is a schematic block diagram of an antenna diversity system with frequency conversion of the antenna reception signals into the IF plane, as in FIG. 6, but with subsequent analog-digital conversion in the analog-digital converters.

FIG. 7 is an antenna diversity system with frequency conversion of the antenna reception signals 7a, b into the IF plane, as in FIG. 6. but with subsequent analog-digital conversion in the analog-digital converters 28a, 28b, and with the digitalized IF signals 23a, 23b for further digital processing in the digital signal processor 14, the output signal of which is passed to the receiver 1 as a digital reception signal 30, by way of the receiver line 4. The function of the evaluation circuit 19 for indicating interference in the reception signal 30, as well as the function of the processor 3 with the search algorithm 17 stored in its memory, for setting the function of the digitally adjustable linear combination element 12 are configured digitally in the signal processor 14. The formation of the linear combination takes place by means of digital calculation in the digital signal processor 14.

With this design, the frequency conversion in FIG. 7 is followed by an analog-digital conversion in the analog-digital converters 28a, 28b for further digital processing in a digital signal processor 14. The function of the evaluation circuit 19 for indicating interference in the digital reception signal 30, as well as the function of the processor 3 with the search algorithm 17 stored in its memory, is for setting the function of the digitally adjustable linear combination element 12, which is configured digitally in the signal processor 14. The formation of the linear combination takes place by means of digital calculation in the digital signal processor 14, whose output signal is passed to the receiver 1 as a digital reception signal 30, by way of the receiver line 4.

FIGS. 8A and 8B are diagrams of the relative momentary values of the signal levels S1, S2, and the adjacent-channel levels N1, N2 on the desired frequency channel, with reference to the noise level R, in dB, over the path route 1 of Antenna 1 and Antenna 2 on a vehicle, with reference to the wavelength λ. The distance between the median value of the signal level S, distributed according to Rayleigh, and the noise R, is indicated with the arrows $S_{med}/R$, in dB, in each instance. All of the values are stated with reference to the noise R=0 dB. The top value includes the antenna reception signal 7a, while the bottom value discloses the antenna reception signal 7b.

Figures 9A, 9B, 9C:
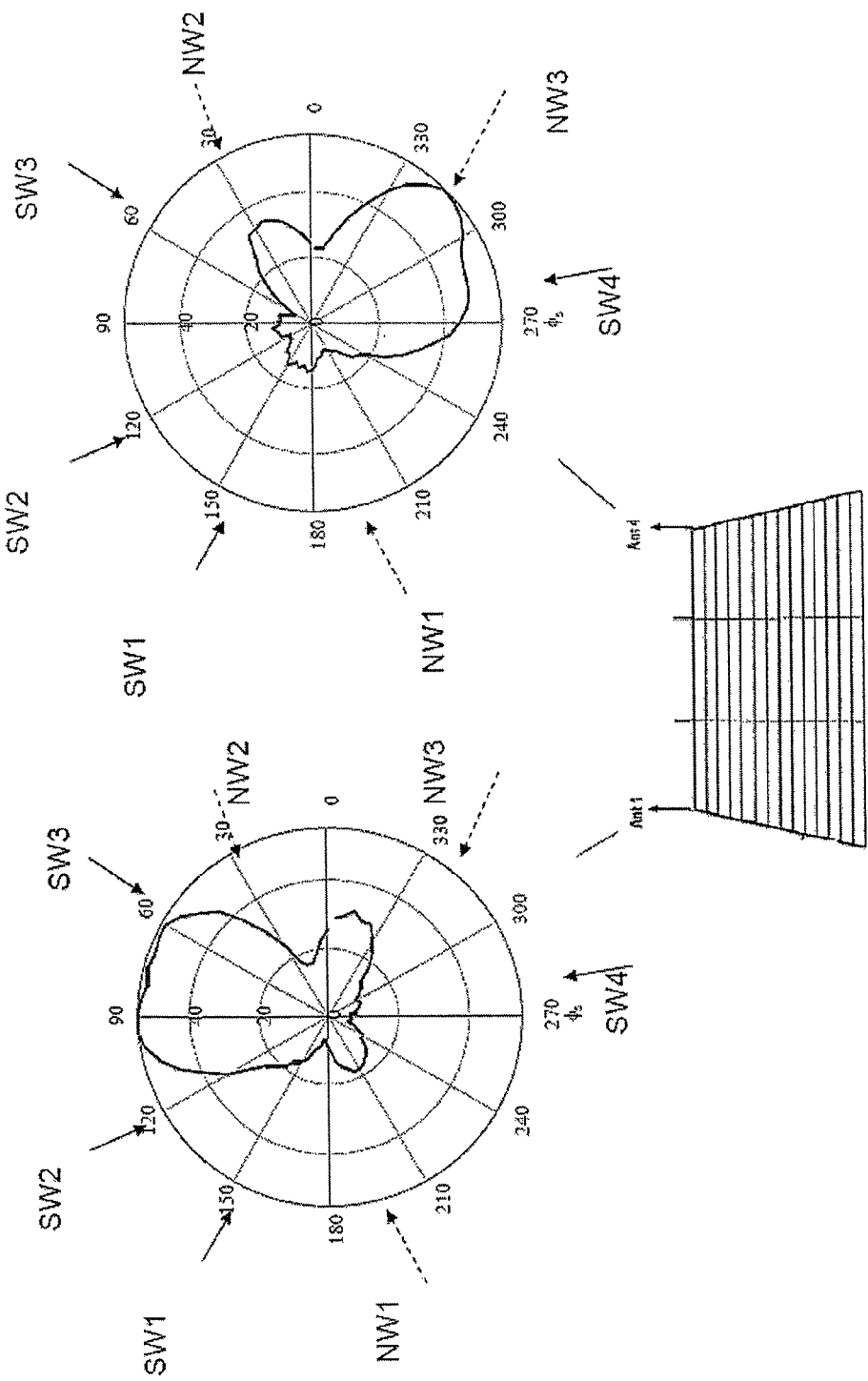
FIG. 9A is a view of a heating field having at least two antennas A1 and A2.
FIG. 9B a first illustration of the formation of the antenna reception signals, which can be captured at the first of the two antennas A1, A2 and formed from the collector bars of a vehicle rear window shown in FIG. 9A.
FIG. 9C is a second illustration of the formation of the antenna reception signals, which can be captured at the second of the two antennas A1, A2 and formed from the collector bars of a vehicle rear window shown in FIG. 9A.

FIGS. 9A, 9B, and 9C show the formation of the antenna reception signals 7a, b, which can be captured at the two antennas A1, A2 formed from the collector bars of a vehicle rear (See FIG. 9A) window, in the example, with the related directional diagrams, shown in terms of magnitude. With the first antenna A1, as shown in FIG. 9B, the waves of the desired signal SW1 . . . SW4, is indicated with arrows, as well as the waves of the adjacent channel NW1 . . . NW3, which impinge as interference, are also shown. All of these signals are subject to the statistical nature of multi-path reception, and are superimposed at each reception location, in each instance, by means of evaluation with the directional diagram of the antenna in question, in terms of magnitude, and according to the direction-dependent phases of the directional diagram (not shown in the figure). FIG. 9C shows the reading for antenna A2 as well.

In this manner, the signals S1, N1 occur at the antenna A1, and accordingly, the signals $\overline{S2}$, $\overline{N2}$ occur at the antenna A2. By means of superimposition of the incident waves according to magnitude and phase, the maxima shown in FIGS. 8A and 8B occur where the waves support one another, and minima occur where they extinguish one another, to a great extent.

Figure 10:
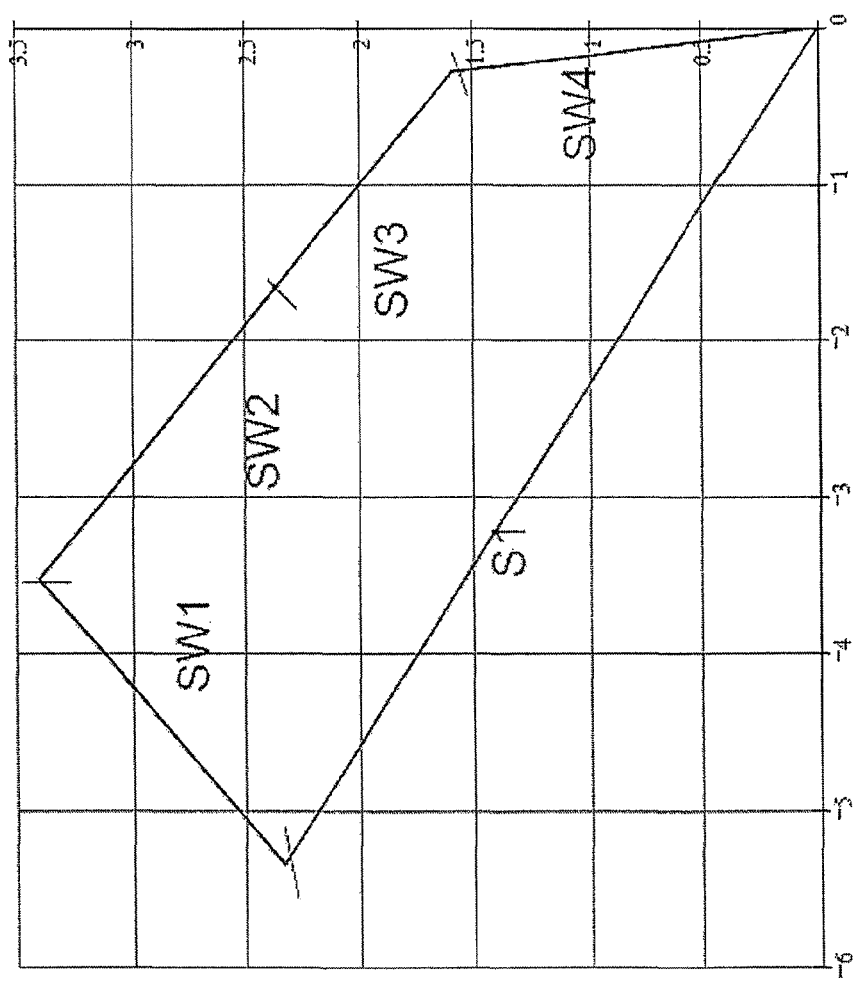
FIG. 10 is a vector diagram of the superimposed received waves SW1 . . . SW4 in FIGS. 9A and 9B, weighted in accordance with magnitude and phase, in accordance with their incidence direction, in each instance, at a reception location having a great reception level S1 of the antenna A1.

FIG. 10 is a vector diagram of the superimposed received waves SW1 . . . SW4 in FIGS. 9B and 9C, weighted in accordance with magnitude and phase, in accordance with their incidence direction, in each instance, at a reception location having a great reception level S1 of the antenna A1.

Figure 11:
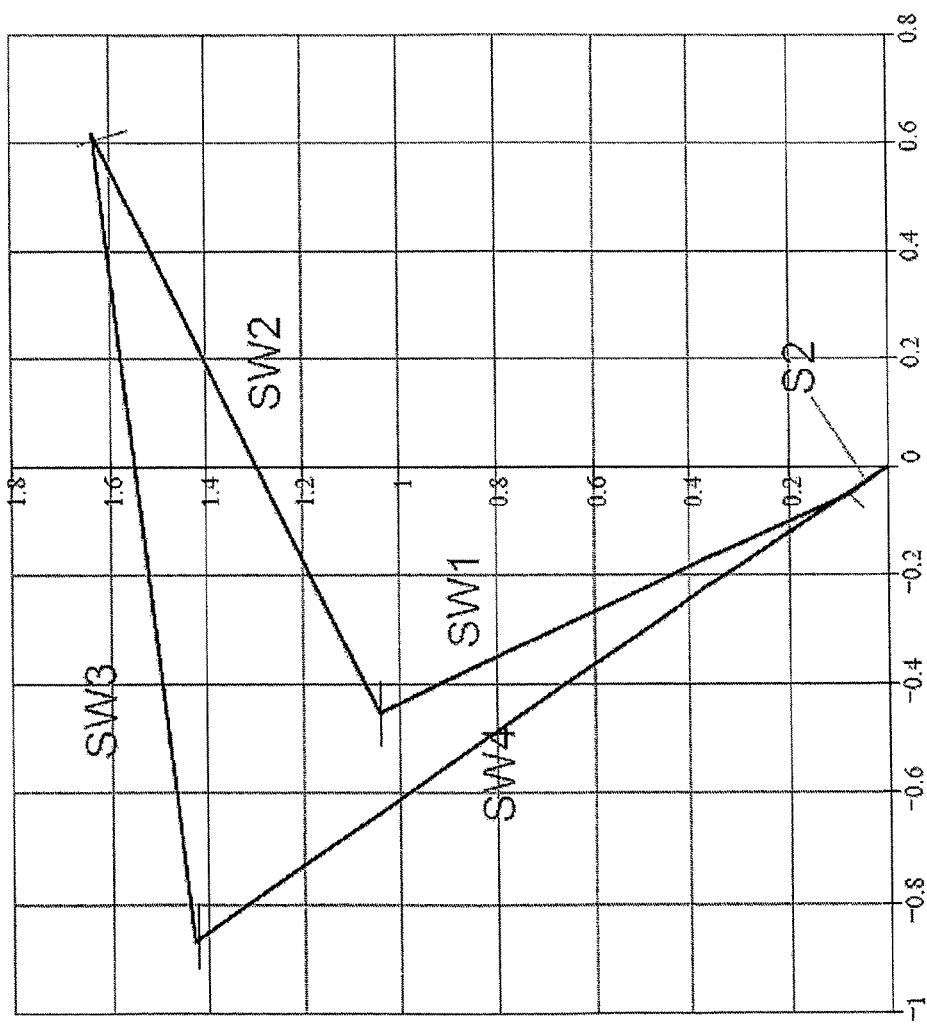
FIG. 11 is a vector diagram as in FIG. 10, but for the antenna A2, at the same reception location, at which a level collapse occurs for this antenna A2, and the effect of these waves SW1 . . . SW4 is cancelled out, except for a small residual level S2.

FIG. 11 is a vector diagram as in FIG. 10, but this diagram is for the antenna A2, at the same reception location, at which a level collapse occurs for this antenna A2, and the effect of these waves SW1 . . . SW4 is cancelled out, except for a small residual level S2.

Because of the statistical incidence of the waves SW1 . . . SW4 of the desired signal, as well as the waves of the adjacent channel NW1 . . . NW3, which impinge as interference, the maxima and the minima for both signals occur at statistically different reception locations in each of the antenna reception signals 7a, b. From this, the disadvantageous situation often results that a great level of the interference signal of the adjacent channel exists at a reception location at which a level collapse occurs in the desired signal of an antenna, so that the desired signal/interference signal ratio SDR is very slight in the reception signal of the antenna in question. This situation makes it clear that the addition of the reception signals of two antennas, with co-phasing of the desired signals, cannot be a particularly effective measure for suppressing interference caused by the adjacent channel, because the antenna reception signal affected by the level collapse of the desired signal generally yields a great interference contribution from the adjacent channel. In such cases, it is actually preferred to combine the signals not with the same phase, and to select the antenna reception signal 7a, and 7b having the greatest desired signal/interference signal ratio SDR, as is the case in scanning diversity.

According to the invention, however, there is an optimal linear combination of the two antenna reception signals 7a, b for every reception situation, with an optimal complex value for $\underline{k}$ in Equation 6, for a maximal value of the SDR in Equation 7. To achieve this optimum, it is not sufficient to exclusively optimize the phase value of the complex k, but rather it is necessary to adjust an advantageous value for the magnitude of k, as well.

Figure 12:
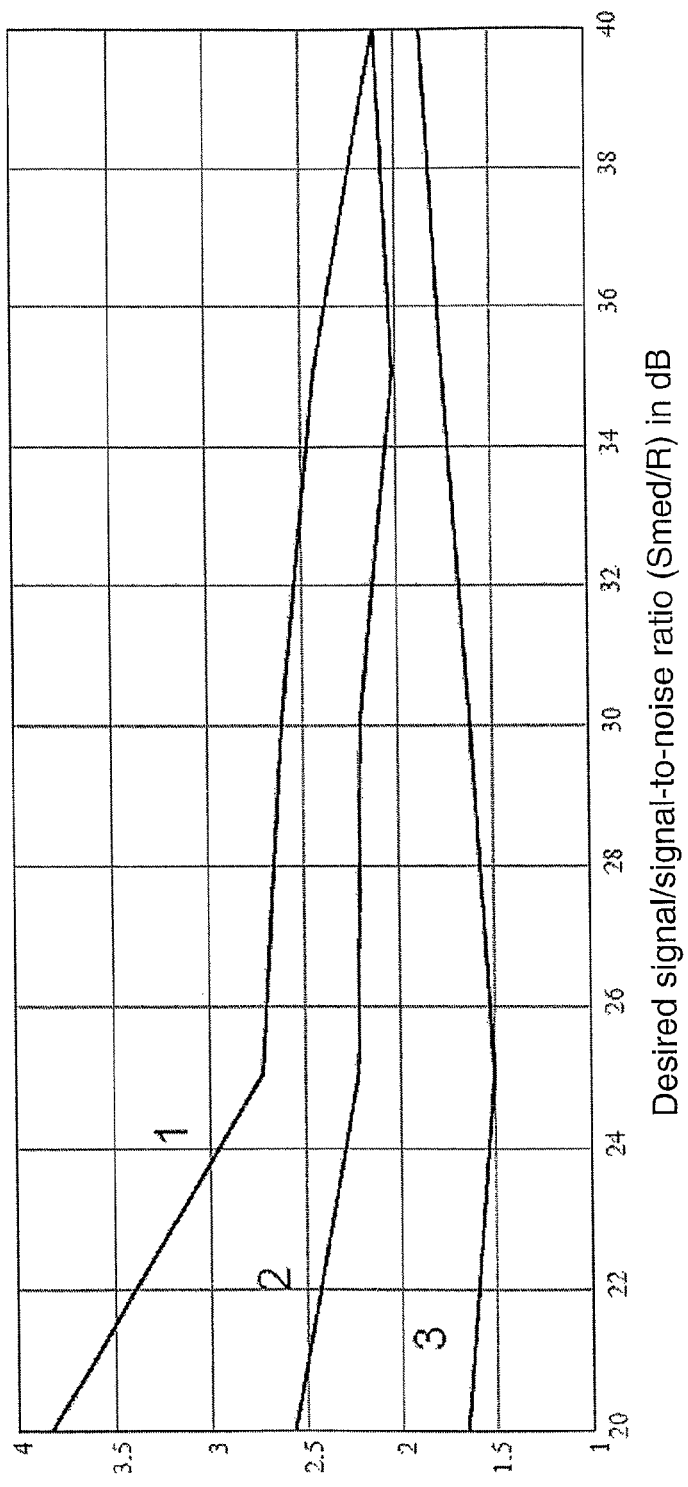
FIG. 12 is a graphical comparison of the diversity efficiency values in the case of reception in the Rayleigh field, with various diversity strategies, in the case of an adjacent channel/signal-to-noise ratio $N_{med}/R=10$ dB.

The performance capacities of the diversity strategies being discussed here are compared in FIG. 12. The relationship between the interference probability $p_e$ without antenna diversity—in other words the interference probability in one of the antenna reception signals—and the interference probability $p_d$ with antenna diversity and the variable n=diversity efficiency, is:

$$P_d = (P_e)^n \qquad (8).$$

In each case, the diversity efficiency values in the case of reception in the Rayleigh field are shown as a function of the distance between the median value $S_{med}$ of the reception level of the desired signal and the noise level R, in dB, at a distance between the interference level $N_{med}$ of the adjacent channel and the noise R of $N_{med}/R=10$ dB. The minimal level of the desired signal that is required due to the presence of noise, at the interference limit, is posited at R=0 dB. Thus, the curves have the meaning:

Curve 1: Diversity efficiency of an antenna diversity system according to the invention. The two antenna signals are continuously combined, in linear manner and with optimal weighting, in terms of magnitude and phase, with reference to the momentary desired signal/interference signal ratio SDR, in accordance with Equation 6.

Curve 2: Diversity efficiency when combining the desired signals S1, S2 of the two antennas, with exclusively optimal phase setting with regard to a relative maximum of the SDR, at a constant magnitude |k|=1.

Curve 3: Diversity efficiency in the case of scanning diversity with two antennas. At every moment, exclusively the one of the two reception signals of the antennas A1 or A2 that has the greater desired signal/interference signal ratio SDR is switched through to the receiver 1.

Figure 13:
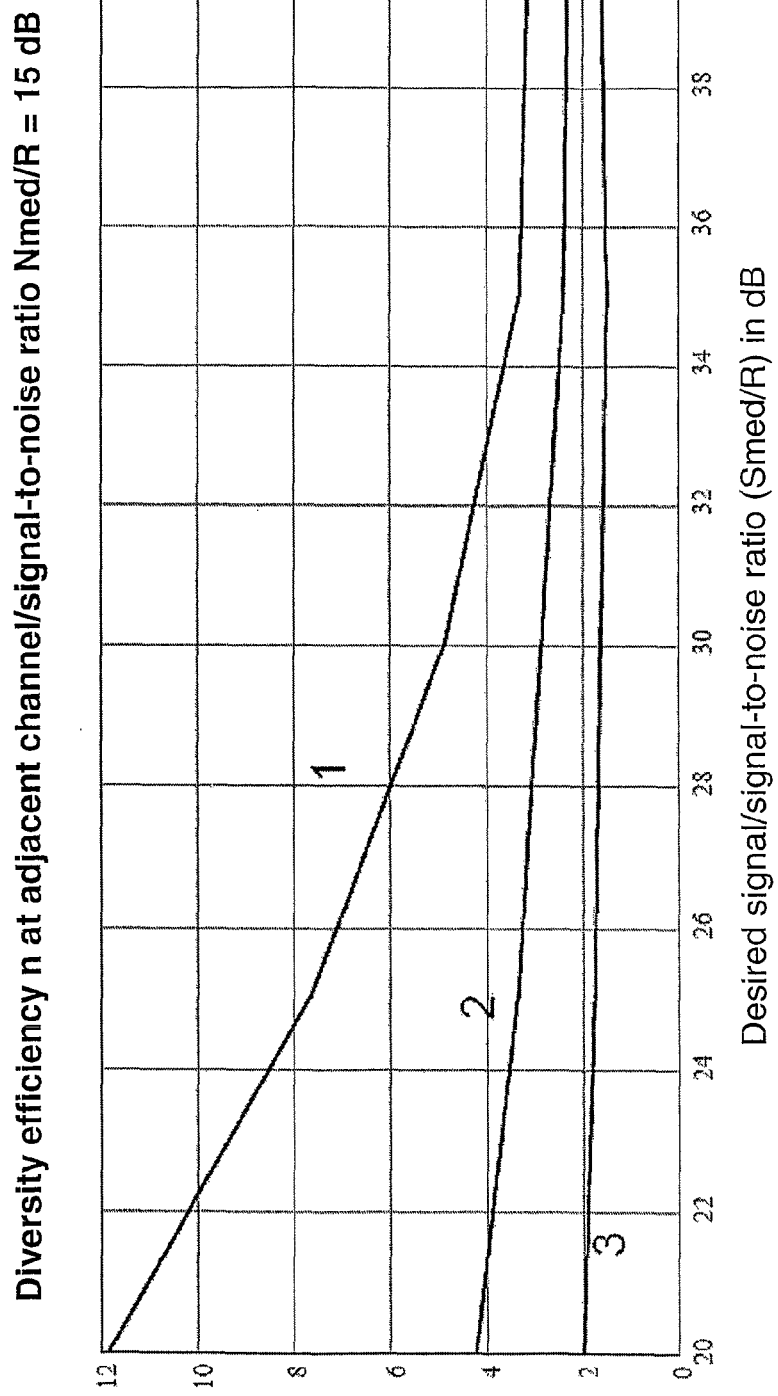
FIG. 13 is a representation as in FIG. 12, but at an adjacent channel/signal-to-noise ratio $N_{med}/R=15$ Db.

In FIG. 13, the diversity efficiency values n for the diversity strategies indicated above are shown in the curves 1, 2 and 3 in a manner analogous to FIG. 12, but at an adjacent channel/signal-to-noise ratio $N_{med}/R=15$ dB.

The two representations in FIGS. 12 and 13 show the clear superiority of the diversity strategy according to the present invention as compared to the other two strategies. The advantage that can be gained by means of the setting of an optimal magnitude and the optimal phase (Curve 1) of the transmission factor k, as compared with the exclusive optimization of the phase (Curve 2) of the transmission factor k, becomes particularly clear at small reception levels of the desired signal.

Figure 14:
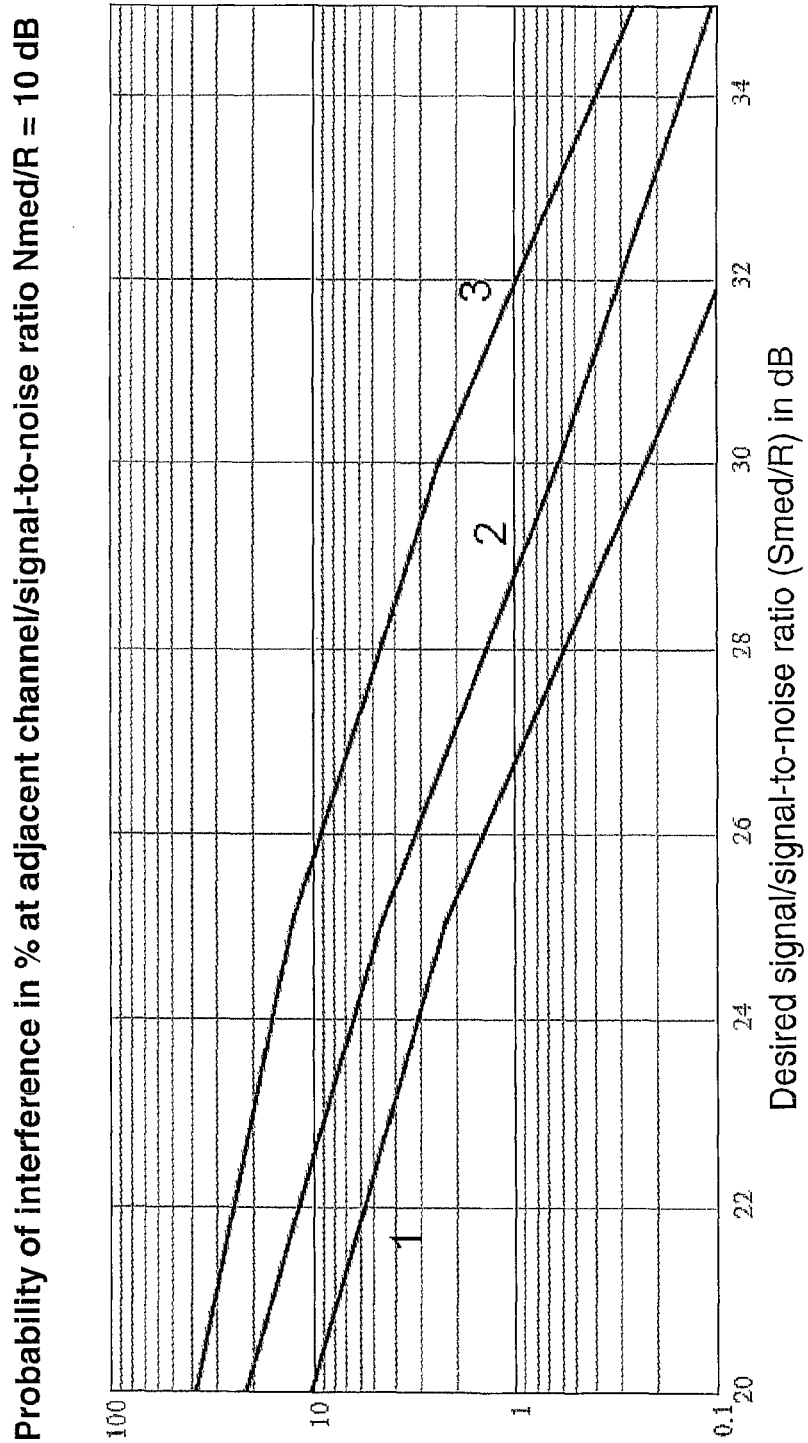
FIG. 14 is the reception situation as in FIG. 12.

For a further illustration of the advantages that can be achieved with the arrangement according to the invention, the probabilities $p_d$ of the interference that occurs is plotted in FIG. 14, corresponding to the reception situation as in FIG. 12, in place of the diversity efficiency values. Again, the curves show:

Curve 1: Diversity efficiency of an antenna diversity system according to the invention. The two antenna signals are continuously combined, in linear manner and with optimal weighting, in terms of magnitude and phase, with reference to the momentary desired signal/interference signal ratio SDR, in accordance with Equation 6.

Curve 2: Diversity efficiency when combining the desired signals S1, S2 of the two antennas, with exclusively optimal phase setting and a constant magnitude $|k|=1$.

Curve 3: Diversity efficiency in the case of scanning diversity with two antennas. At every moment, exclusively the one of the two antenna reception signals 7a, 7b of the antennas A1 or A2 that has the greater desired signal/interference signal ratio SDR is switched through to the receiver.

Figure 15:
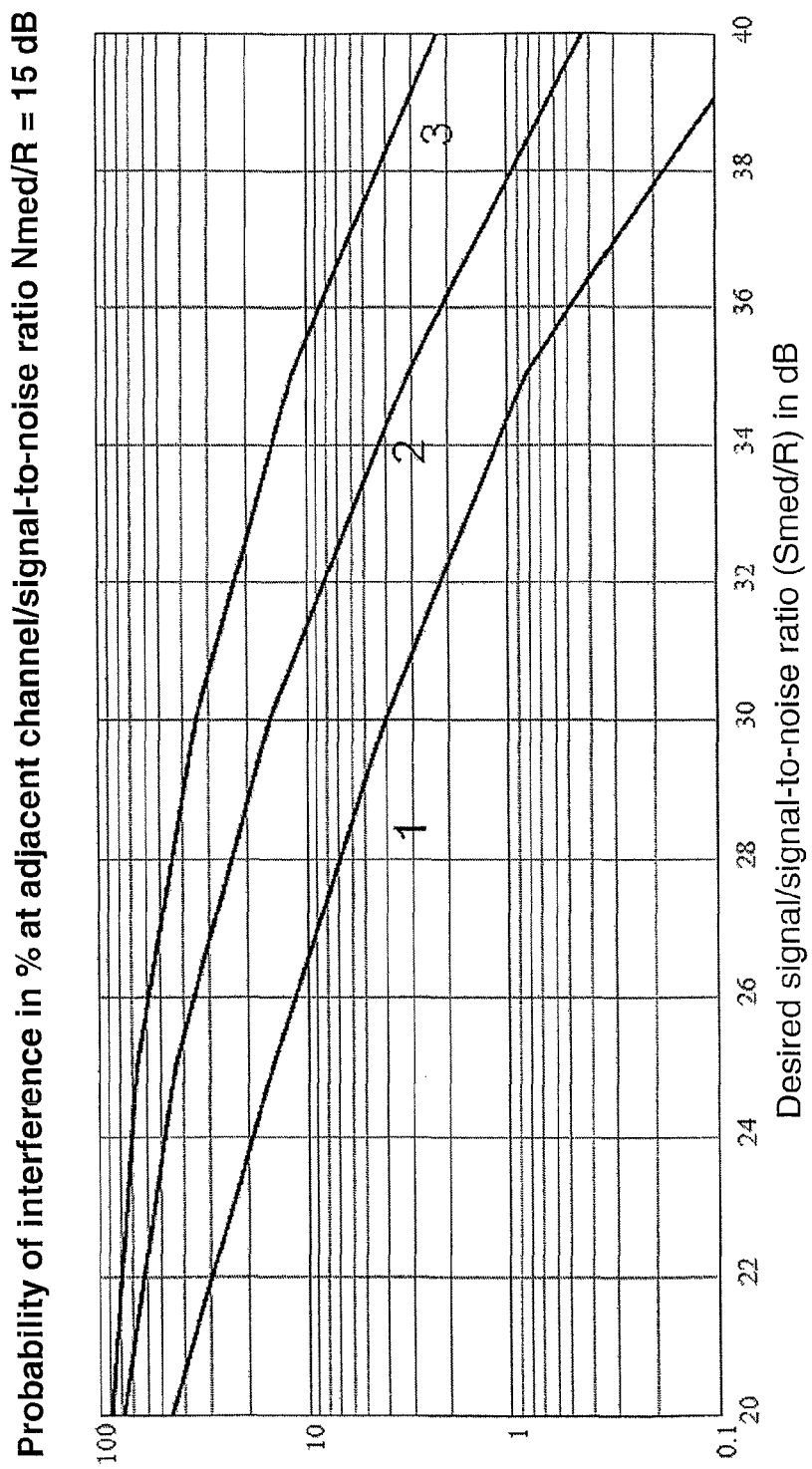
FIG. 15 is a reception situation as in FIG. 13.

In FIG. 15, the probabilities of the interference that occurs, in place of the diversity efficiency values, are plotted in analogous manner, corresponding to the reception situation as in FIG. 13. Curves 1 to 3 describe the same strategies as in FIGS. 12 to 14.

Figure 16:
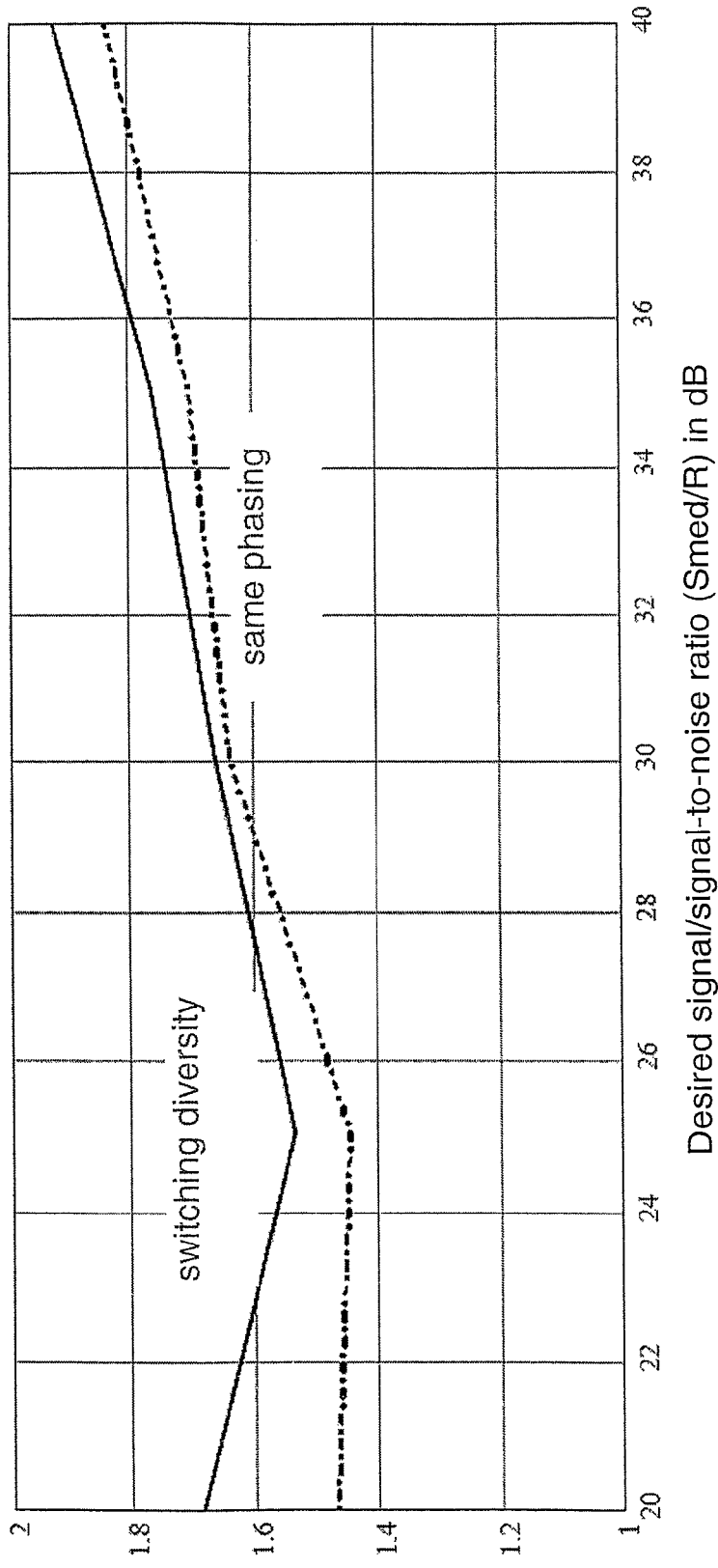
FIG. 16 is a comparison representation of the diversity efficiency n in the case of adjacent-channel interference.

FIG. 16 compares the diversity efficiency values in the case of adjacent-channel interference, with 2 antennas and $N_{med}/R=10$ dB, from the same-phase superimposition of the antenna reception signals 7a, b, and a pure switching diversity. From this, it is clearly evident that the maximization of the desired signal that can be achieved with same phasing, on the basis of the adjacent-channel interference, at every reception location, is not as good as simple switching diversity. With an increasing level of the adjacent-channel interference $N_{med}$, this superiority increases further.

Figure 17:
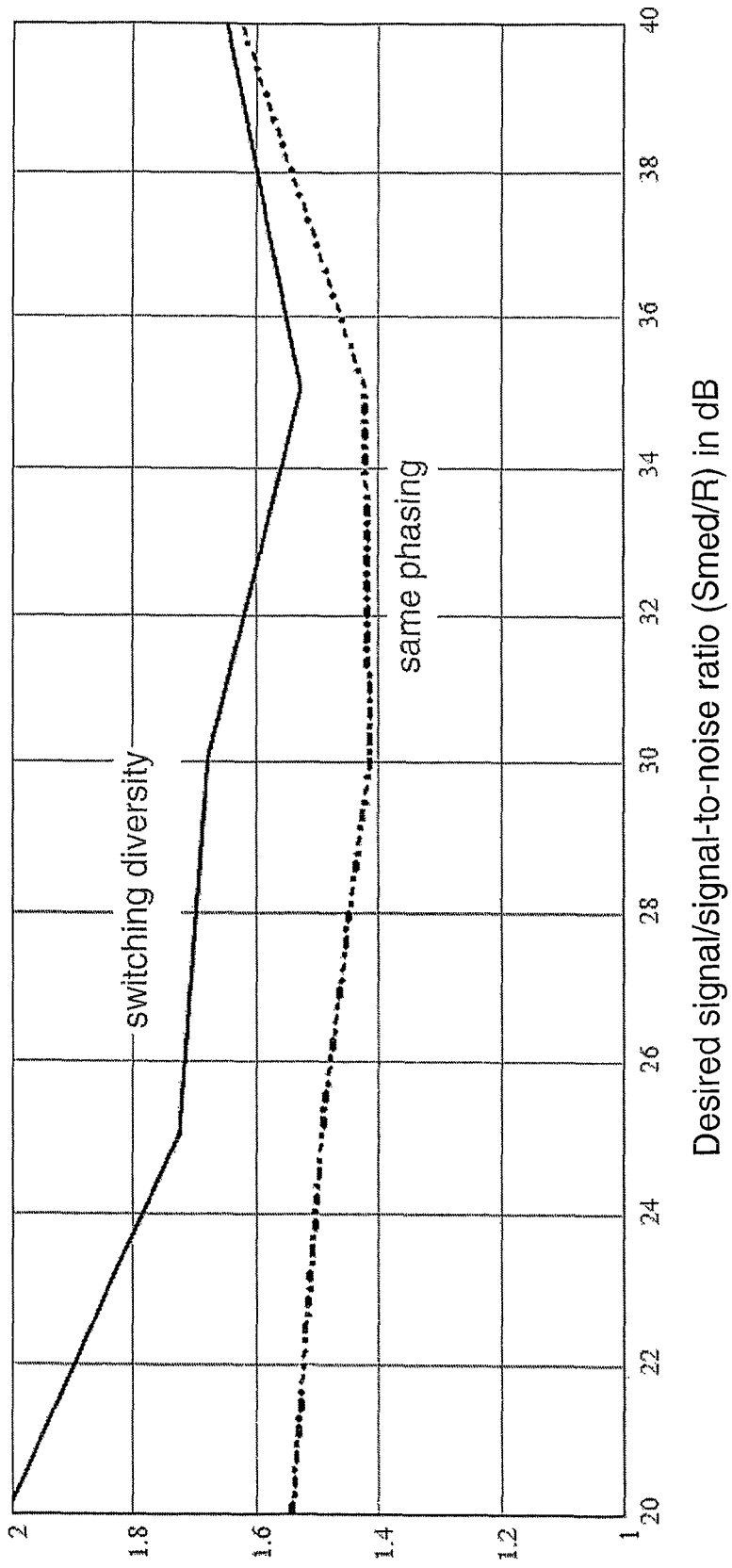
FIG. 17 is a comparison representation of the diversity efficiency n in the case of adjacent-channel interference, with two antennas and $N_{med}/R=15$ dB, from the same phasing of the antenna signals and a pure switching diversity.

This is clearly evident from FIG. 17, in which the diversity efficiency n is shown with the conditions remaining the same otherwise, but for $N_{med}/R=15$ dB. Because of the adjacent-channel interference, same phasing is clearly not as good as the simpler switching diversity here. This proves, in connection with the results shown in FIGS. 12 through 15, that maximal diversity efficiency can be achieved with an antenna diversity system according to the present invention, with only two antennas.

In another advantageous embodiment of the invention, at least one receiver tuner 32 is present in the receiver 1, for tunable selective reception of an additional radio channel. Such a receiver tuner 32 is necessary in a radio receiver with antenna diversity for ultra-short-wave reception, according to the present invention, for example, in order to also receive stations in the long-wave, medium-wave, short-wave range, or, for example, to allow evaluation of the additional signals of the various radio stations broadcast using the Radio Data System (RDS), with an ultra-short-wave receiver tuner 32 that works in the background. According to the invention, it is therefore advantageous, in the case of an antenna diversity system of the present type, to pass the reception signals of at least one of the two antennas to the receiver 1 without any change in frequency position, and to pass them to the corresponding receiver tuner 32 there, for selective reception of an additional radio channel. This can be done, in the arrangement in FIG. 6, for example, in such a manner that the antenna reception signal 7a is looped through the antenna diversity module 6, to its output, and passed to the receiver tuner 32 situated in the receiver 1 by way of the receiver line 4.

Accordingly, while only a few embodiments of the present invention have been shown and described, it is obvious that many changes and modifications may be made thereunto without departing from the spirit and scope of the invention.

LIST OF ELEMENTS receiver 1
antenna group 2 of Antennas A1 and A2
processor 3
receiver line 4
adjustable transmission element 5
antenna diversity module 6
antenna reception signal 7a, 7b
reception signal 8
summation element 9
phase-rotation device 10
signal level element 11a, 11b
linear combination element 12
level setting signals 13a and phase setting signals 13b
digital signal processor 14
first signal path 15
second separate signal path 16
search algorithm 17
interference indication signal 18
evaluation circuit 19
IF signal 20
IF filters 21a, 21b
amplifiers with pre-selection 22a, 22b,
IF signals 23a, 23b
antenna amplifiers 24a, 24b
IF frequency converters 25a, 25b
oscillator 26
intermediate-frequency plane 27
analog-digital converters 28a, 28b
oscillator voltage 29
digital reception signal 30
IF reception signal 31
receiver tuner 32
noise level R

What is claimed is:

1. An antenna diversity system for radio reception in moving vehicles comprising:
   a) a receiver;
   b) a receiver line;
   c) at least two antennas;
   d) a plurality of antenna feed lines coupled to said at least two antennas for transmitting a plurality of antenna feed signals; and
   e) an antenna diversity module coupled to said receiver, via said receiver line, and to said at least two antennas, via said plurality of antenna feed lines, said antenna diversity module comprising:

i) at least one evaluation circuit for evaluating an interference in a reception signal from said antenna feed signals; and ii) at least one processor for adjusting a magnitude and a phase angle of a linear combination of said plurality of antenna feed signals for creating a relatively low interference reception signal by said at least one evaluation circuit reading and sending an interference indication signal to said at least one processor;

wherein said antenna diversity module combines said plurality of antenna feed signals in an adjustable manner based on a magnitude and a phase angle, to form a linear combined signal that is present at an output of said antenna diversity module as a reception signal.

2. The diversity system as in claim 1, wherein said antenna diversity module further comprises, an adjustable linear combination element, having a first and a second input for receiving at least one of said plurality of antenna feed signals wherein said plurality of antenna feed signals are superimposed in said adjustable linear combination element, wherein said plurality of antenna feed signals are combined according to magnitude and phase, forming a linear combined signal that is weighted at an output of said antenna diversity module, which is in the form of said reception signal;

at least one adjustable linear transmission element having an adjustable complex transmission factor ($\underline{k}$) in said adjustable linear combination element to set a weighing of superimposition according to magnitude of signal and phase;

wherein said interference indication signal of said evaluation circuit is passed to said at least one processor wherein a set of setting signals passed from said at least one processor are for setting said adjustable linear combination element; and wherein said at least one processor has a memory which stores a search algorithm according to an interference indicated by said at least one evaluation circuit, wherein interference of said reception signal arriving at said receiver is successively reduced in steps that follow one another within a relatively short period of time.

3. The antenna diversity system as in claim 2, wherein said adjustable linear combination element further comprises:

a summation element;

at least one first and at least one second separate signal path, wherein an output of said signal paths are passed to a set of inputs of said summation element and wherein said signal paths are summed in said summation element forming a summed signal which is passed to said receiver via said receiver line;

at least one adjustable signal level element for setting an magnitude of complex transmission factor of said separate signal paths, wherein at least one level setting signal is passed to at least one adjustable signal level element;

at least one adjustable phase rotation device for setting a phase angle of said complex transmission factor of said signal path; and wherein a phase signal which is required for setting a phase angle of said complex transmission factor of said signal path is passed to said at least one adjustable phase rotation device.

4. The antenna diversity system as in claim 3, wherein said at least one signal level element which is for setting a magnitude of a complex transmission factor, and wherein said at least one phase rotation device which is present for setting a phase angle of said complex transmission factor, are both digitally adjustable, wherein said output signal of said processor is configured as a logical setting signal for setting a complex transmission factor.

5. The antenna diversity system as in claim 1, further comprising:

a) a plurality of IF frequency converters disposed in said antenna diversity module, for converting each of said antenna feed signals, wherein each of said plurality of IF frequency converters convert an antenna feed signal to an IF frequency plane;

b) an oscillator disposed in said receiver which provides oscillator vibration which is passed to said plurality of IF frequency converters via said receiver line, wherein said adjustable linear combination element, is configured for intermediate frequency, and wherein said reception signal is formed at an output of said adjustable linear combination element as an IF reception signal.

6. The antenna diversity system as in claim 5, further comprising:

a plurality of analog to digital converters wherein each of said plurality of IF frequency converters is coupled to a corresponding one of said plurality of analog to digital converters, at least one digital signal processor disposed along an intermediate frequency plane wherein functions of said adjustable linear combination element, said at least one evaluation circuit, and said at least one processor are performed by said at least one digital signal processor, in a digitized manner, wherein said reception signal is passed to said receiver as a digital reception signal via said receiver line for further processing; wherein said at least one digital signal processor (14) performs calculations using a search algorithm, wherein said calculations are for instructing said at least one evaluation circuit (19) to provide a digital output variable for setting a linear combination.

7. The antenna diversity system as in claim 5, further comprising:

a) at least one receiver tuner disposed in said receiver, wherein said receiver tuner is for selective reception of an additional radio channel, wherein reception signals which are received by at least one of said at least two antennas are passed through said antenna diversity module in an original frequency position, and then passed to said receiver by way of said receiver line and then on to said receiver tuner for selective reception of an additional radio channel.

8. The antenna diversity system as in claim 1, further comprising:

an oscillator disposed in said antenna diversity module, wherein said antenna diversity module is configured to be digitally tunable wherein a set of frequency data is passed to said oscillator, as a digital signal by said receiver, via said receiver line to set an oscillator frequency.

9. The antenna diversity system as in claim 1, wherein said at least two antennas are configured as having a limiting effect tailored to a receiver frequency band in question, to suppress minor frequencies.

10. The antenna diversity system as in claim 9, further comprising a plurality of IF frequency converters disposed in said antenna diversity module;

wherein said at least two antennas are structured as active antennas having a sufficiently great signal amplification, and wherein said at least two antennas have a signal level regulation device, wherein said antenna reception signals are passed to a related one of said plurality of IF frequency converters.

11. The antenna diversity system as in claim 10, wherein said at least two antennas have approximately a same reception power; wherein said at least one processor has a search algorithm that selects different phase settings in consecutive search steps, wherein said search algorithm is stored in a memory of said processor, wherein when said setting occurs, different magnitude values are set for linear combination, wherein said process is continued until said interference indication signal assumes a small value, which corresponds to a reception perceived as relatively pure, such as until the indication signal assumes a minimal value.

12. The antenna diversity system as in claim 1, wherein said at least two antennas have a same reception power;
wherein said processor has a search algorithm and conducts consecutive search steps at a setting transmission factor of |k|=1 and wherein a corresponding interference indication signal is detected and compared, and, wherein the processor conducts the following steps:
a) detecting and comparing interference indication signals (18);
b) determining an angle setting having a smallest interference by means of halving a remaining angle region of at least one quadrant of at least four angle quadrants, in an analog manner, with said angle being determined with an accuracy up to minimally 10 degrees, wherein at this setting, said magnitude |k| is changed, beginning with greater steps and proceeding with smaller steps up to 1 dB, wherein said search process is stopped when said interference indication signal assumes a small value that corresponds to a reception perceived as pure.

13. The antenna diversity system as in claim 1, wherein said at least one evaluation circuit and said processor are disposed in said antenna diversity module and wherein said reception signal is passed to said antenna diversity module by way of said antenna reception line and wherein said reception signal is passed to said at least one evaluation circuit to check for interference in the form of an IF signal formed in said receiver.

14. The antenna diversity system as in claim 1, further comprising:
a) at least one receiver tuner disposed in said receiver, wherein said receiver tuner is for selective reception of an additional radio channel, wherein reception signals which are received by at least one of said at least two antennas are passed through said antenna diversity module in an original frequency position, and then passed to said receiver by way of said receiver line and then on to said receiver tuner for selective reception of an additional radio channel.

15. An antenna diversity system for radio reception in moving vehicles comprising:
a) a receiver comprising at least one evaluation circuit for evaluating an interference in a reception signal;
b) a receiver line;
c) at least two antennas coupled to said receiver;
d) a plurality of antenna feed lines coupled to said at least two antennas for transmitting a plurality of antenna feed signals forming at least one reception signal;
e) an antenna diversity module coupled to said receiver, via said receiver line, and to said at least two antennas, via said plurality of antenna feed lines; and
f) at least one processor for adjusting a magnitude of and a phase angle of a linear combination of said at least two antenna feed signals for creating a relatively low interference reception signal by said at least one evaluation circuit reading and sending an interference indication signal to said at least one processor;
wherein said diversity module via instructions from said at least one processor combines said plurality of antenna feed signals in an adjustable manner based on a magnitude and a phase angle, determined from said interference indication signal to form a linear combined signal that is present at the output of said antenna diversity module as a reception signal.

16. The antenna diversity system as in claim 15, wherein said at least one processor is disposed in said receiver, wherein said at least one processor generates setting signals in a digital manner, which are passed to said antenna diversity module via said receiver line;
wherein said antenna diversity module comprises:
an adjustable linear combination element, having a first and a second input for receiving at least one of said plurality of antenna feed signals wherein said plurality of antenna feed signals are superimposed in said adjustable linear combination element, wherein said plurality of antenna feed signals are combined according to magnitude and phase, forming a linear combined signal that is weighted at an output of said antenna diversity module, which is in the form of said reception signal, wherein said setting signals from said processor are passed to said adjustable linear combination element.

17. An antenna diversity module having an input capable of coupling to at least two antennas for receiving a plurality of antenna signals and an output for feeding into a receiver, the diversity module comprising:
a) at least one evaluation circuit for evaluating an interference in a reception signal from said antenna feed signals;
b) at least one processor for adjusting a magnitude and a phase angle of a linear combination of said plurality of antenna feed signals for creating a relatively low interference reception signal by said at least one evaluation circuit reading and sending an interference indication signal to said at least one processor;
c) an adjustable linear combination element, having a first and a second input for receiving at least one of the plurality of antenna feed signals wherein the plurality of antenna feed signals are superimposed in said adjustable linear combination element, wherein the plurality of antenna feed signals are combined according to magnitude and phase, forming a linear combined signal that is weighted at an output of said antenna diversity module, which is in the form of said reception signal;
d) at least one adjustable linear transmission element having an adjustable complex transmission factor (k) in said adjustable linear combination element to set a weighing of superimposition according to magnitude of signal and phase;
e) a summation element;
f) at least one first and at least one second separate signal path, wherein an output of said signal paths are passed to a set of inputs of said summation element and wherein said signal paths are summed in said summation element forming a summed signal which is passed to the receiver via a receiver line;
g) at least one adjustable signal level element for setting a magnitude of a complex transmission factor of said separate signal paths, wherein at least one level setting signal is passed to said at least one adjustable signal level element from said at least one processor; and h) at least one adjustable phase rotation device for setting a phase angle of said complex transmission factor of said signal path; and wherein a phase signal which is required for setting a phase angle of said complex transmission factor of said signal path is passed to said at least one adjustable phase rotation device;

wherein said interference indication signal of said evaluation circuit is passed to said at least one processor wherein a set of setting signals passed from said at least one processor are for setting said adjustable linear combination element;

wherein said at least one processor has a memory which stores a search algorithm according to an interference indicated by said at least one evaluation circuit, wherein interference of said reception signal arriving at said receiver is successively reduced in steps that follow one another within a relatively short period of time;

wherein said antenna diversity module combines said plurality of antenna feed signals in an adjustable manner based on a magnitude and a phase angle, to form a linear combined signal that is present at an output of said antenna diversity module as a reception signal.

18. The antenna diversity module as in claim 17, wherein said relatively low interference reception signal is a a non-disturbing-low interference reception signal.

19. An antenna diversity module which can be connected to a receiver and to antennas creating a plurality of antenna feed signals, the diversity module comprising:

a) at least one evaluation circuit for evaluating an interference in a reception signal from the antenna feed signals; and b) at least one processor for adjusting a magnitude and a phase angle of a linear combination of the plurality of antenna feed signals for creating a relatively low interference reception signal by said at least one evaluation circuit reading and sending an interference indication signal to said at least one processor;

wherein said antenna diversity module combines the plurality of antenna feed signals in an adjustable manner based on a magnitude and a phase angle, to form a linear combined signal that is present at an output of said antenna diversity module as a reception signal.

* * * * *